(12) United States Patent  
van der Laan et al.

(10) Patent No.: US 8,996,445 B2
(45) Date of Patent: Mar. 31, 2015

(54) COLLABORATIVE TARGETED MAXIMUM LIKELIHOOD LEARNING

(75) Inventors: Mark van der Laan, Orinda, CA (US); Susan Gruber, Cupertino, CA (US)

(73) Assignee: The Regents of the University of California, Oakland, CA (US)

( * ) Notice: Subject to any disclaimer, the term of this patent is extended or adjusted under 35 U.S.C. 154(b) by 724 days.

(21) Appl. No.: 13/263,252

(22) PCT Filed: Apr. 7, 2010

(86) PCT No.: PCT/US2010/030292
§ 371 (c)(1),
(2), (4) Date: Nov. 11, 2011

(87) PCT Pub. No.: WO2010/118170
PCT Pub. Date: Oct. 14, 2010

(65) Prior Publication Data
US 2012/0271791 A1    Oct. 25, 2012

Related U.S. Application Data

(60) Provisional application No. 61/167,502, filed on Apr. 7, 2009.

(51) Int. Cl.
*G06N 5/00* (2006.01)
*G06F 1/00* (2006.01)
*G06N 99/00* (2010.01)
(52) U.S. Cl.
CPC .................................. *G06N 99/005* (2013.01)
USPC ............... 706/52; 375/341; 455/62

(58) Field of Classification Search
CPC ....... G06N 7/005; G06N 99/005; G06N 5/02; G06Q 30/02
See application file for complete search history.

(56) References Cited

U.S. PATENT DOCUMENTS

| 7,092,457 | B1 | 8/2006 | Chugg et al. |
| 7,304,912 | B2 | 12/2007 | Gendron |
| 2009/0016470 | A1 | 1/2009 | Van Der Laan |
| 2010/0322300 | A1* | 12/2010 | Li et al. .................... 375/240.01 |

OTHER PUBLICATIONS

Targeted Maximum Likelihood Learning, 2006, Van Der Laan, Article 11, The international journal of biostatistics, all pages.*

(Continued)

*Primary Examiner* — Li-Wu Chang
*Assistant Examiner* — Kalpana Bharadwaj
(74) *Attorney, Agent, or Firm* — Trellis IP Law Group, PC

(57) ABSTRACT

A method is provided comprising: determining one or more initial distribution estimators of a true probability distribution; determining for each series of estimators of a nuisance parameter; generating candidate targeted estimators of the probability distribution for a targeted feature using an iterative modification of the initial distribution estimator(s) designed to reduce bias in the estimate of the target feature with respect to the initial distribution estimator, based on the series of estimators and the targeted feature; selecting one of the candidate estimators as an estimator for the true probability distribution for the targeted feature; and applying a mapping to the estimator for the true probability distribution or relevant portion thereof to obtain an estimated value for the targeted feature.

27 Claims, 8 Drawing Sheets

(56) References Cited

OTHER PUBLICATIONS van der Vaart, Aad W. et al.; "Oracle Inequalities for Multi-Fold Cross Validation"; Sep. 6, 2006; 21 pages.

van der Laan, Mark J. et al.; "Targented Maximum Likelihood Learning"; The International Journal of Biostatistics, vol. 2 Issue 1, Art. 11, 2006; 40 pages.

van der Laan, Mark J. et al.; "Super Learner"; Statistical Applications in Genetics and Molecular Biology, vol. 6 Issue 1, Art. 25, 2007; 23 pages.

van der Laan, Mark J. et al.; "The Cross-Validated Adaptive Epsilon-Net Estimator"; UC Berkeley Division of Biostatistics Working Paper Series, Year 2004, Paper 142; 47 pages.

van der Laan, Mark J. et al.; "Asymptotic Optimality of Likelihood-Bases Cross-Validation"; May 12, 2003; 27 pages.

Sinisi, Sandra E. et al.; "Loss-Based Cross-Validated Deletion/Substition/Addition Algorithms in Estimation"; UC Berkeley Division of Biostatistics Working Paper Series, Year 2004, Paper 143; 54 pages.

Sekhon, Jesjeet S.; "Multivariate and Propensity Score Matching Software With Automated Balance Optimization: The Matching Package for R"; The Journal of Statistical Software; 48 pages.

Robins, James M. et al.; American Statistical Association, Journal of the American Statistical Association, Jun. 2000, vol. 95, No. 450, Theory and Methods; 6 pages.

Robins J. M. and Rotnitzky A. (2001). Comment on the Bickel and Kwon article,, "Inference for semiparametric models: Some questions and an answer." Statistica Sinica, 11(4):920-936; 17 pages.

Robins, James; "A New Approach to Causal Inference in Mortality Studies With Sustained Exposure Period-Application to Control of the Healthy Worker Survivor Effect"; Mathematical Modelling, vol. 7, pp. 1393-1512, 1989; 121 pages.

Robins, James M.; "Marginal Structural Models Versus Structural Nested Models as Tools for Causal Inference"; Statistical Models in Epidemiology: the Environment and Clinical Trails, IMA vol. 116 pp. 95-134; 30 pages.

Robins, James M.; "Robust Estimation in Sequentially Ignorable Missing Data and Causal Inference Models"; Proceeding of the American Statistical Association Section on Bayesian Statistical Science 1999, pp. 6-10, 2000; 5 pages.

Holland, John H. et al; "Cognative Systems Bases on Adaptive Algorithms"; SIGART Newsletter No. 63 Jun. 1977; 1 page.

Herman, Miguel Angel et al.; "Marginal Structural Models to Estimate the Causal Effect of Zidovudine on the Survival of HIV-Positive Men"; Epidemiology, Sep. 2000, vol. 11 No. 5; 10 pages.

Bembom, Oliver et al.; "Data-Adaptive Selection of the Adjustment Set in Variable Importance Estimation"; UC Berkeley Division of Biostatistics Working Paper Series, Year 2008, Paper 231; 28 pages.

\* cited by examiner

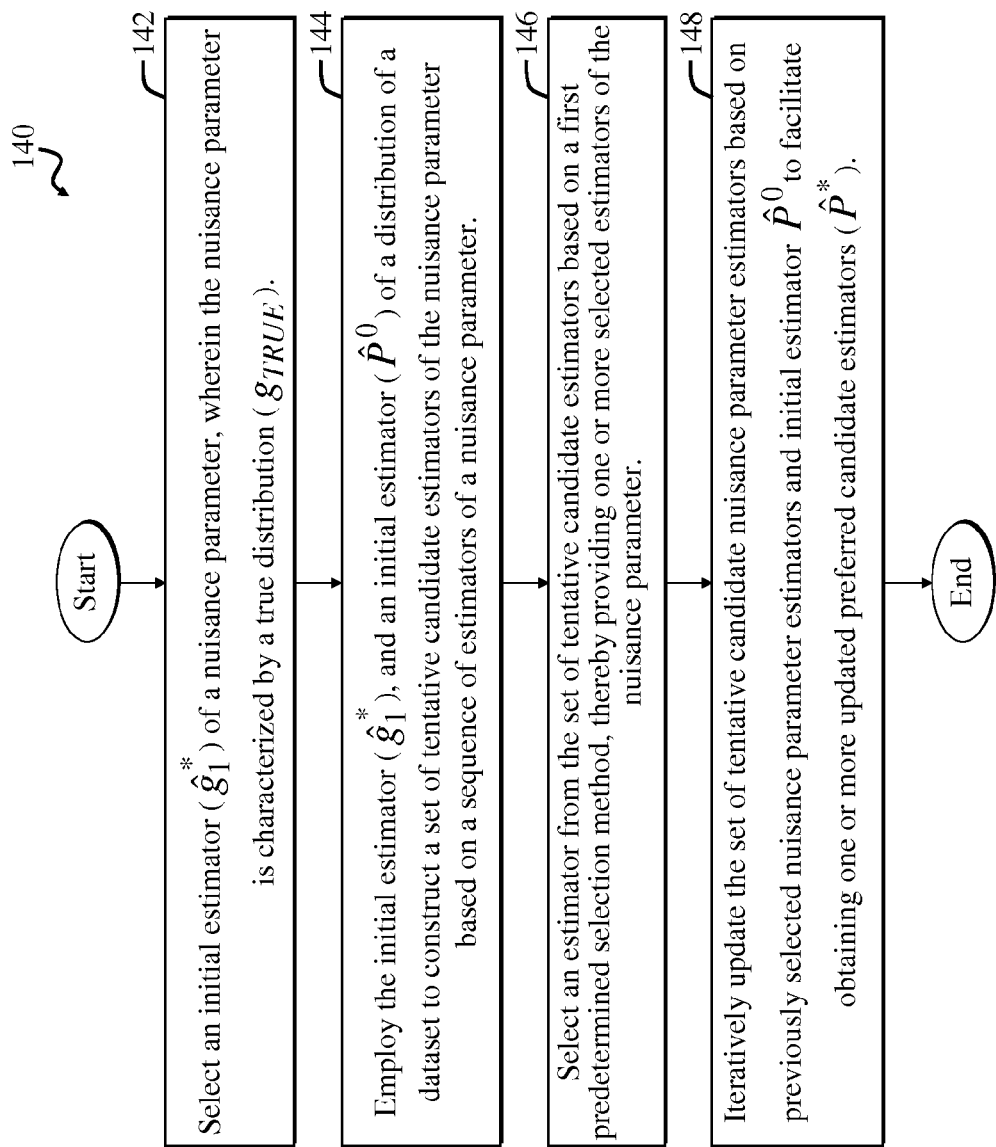

COLLABORATIVE TARGETED MAXIMUM LIKELIHOOD LEARNING

CROSS REFERENCES TO RELATED APPLICATIONS

This invention claims priority from U.S. Provisional Patent Application Ser. No. 61/167,502, entitled COLLABORATIVE TARGETED MAXIMUM LIKELIHOOD LEARNING, filed on Apr. 7, 2009, which is hereby incorporated by reference as if set forth in full in this specification.

ACKNOWLEDGMENT OF GOVERNMENT SUPPORT

This invention was made with Government support under Contract Number AI074345, awarded by National Institutes of Health. The Government has certain rights to this invention.

BACKGROUND

Particular embodiments generally relate to data analysis and more specifically to reducing bias in likelihood estimation of a target feature.

Likelihood estimation involves using an estimator, called a likelihood estimator, to estimate a true probability distribution characterizing a given data set. Likelihood estimators, also called density estimators, may facilitate answering specific questions or features of interest pertaining to the data.

Processes for determining an estimator of a probability distribution or likelihood estimator descriptive of a given dataset are employed in various demanding applications including analysis of experimental results from scientific studies, determination of probabilities of occurrences of certain events based on observations, and so on. Such applications often demand robust, accurate, unbiased methods for determining answers to a specific question or feature of interest given a dataset. The dataset may represent experimental results or other observations.

Probability estimation and likelihood estimation are particularly important in biological fields, such as genetics, medicine, and communications systems, where complex problems involving multiple variables are common. Probability calculations often involve employing a probability distribution, also called a probability density function, to evaluate the probability of occurrence of a given event or other feature of the probability distribution. The true probability distribution or density function is often unknown. Therefore, one uses an estimate of the probability distribution based on data, and one then uses this estimate to evaluate the wished probabilities pertaining to events of interest or another particular feature of the probability distribution. When using likelihood estimation, estimates of the probability of occurrence of a given event, or of any other feature of the true probability distribution, are obtained via one or more estimates of a true probability distribution.

Conventionally, a few global parameters of a distribution, such as the standard deviation and mean of the normal distribution are adjusted to describe the observed data as accurately as possible. Unfortunately, observed data does not always behave according to various well-known distributions, and realistic knowledge about the data-generating experiment typically does not allow one to assume that the true probability distribution of the data can be accurately described with a small number of unknown parameters. These types of descriptions of the true probability distribution of the data are called parametric models in the classical statistical literature, and many standard statistical software packages employ such parametric models.

Consequently, such parametric models for the true probability distribution may yield particularly inaccurate (maximum likelihood) estimators of the true probability distribution, and such estimators are often particularly biased for a particular feature of the probability distribution, and thereby for answering particular questions of interest.

SUMMARY

An example collaborative targeted maximum likelihood learning method includes: determining an initial distribution estimator of a true probability distribution or relevant portion of the true probability distribution; determining a series of estimators of a nuisance parameter; generating candidate estimators of the probability distribution or relevant portion of the true probability distribution for a targeted feature using an iterative modification of the initial distribution estimator designed to reduce bias in the estimate of the target feature with respect to the initial distribution estimator, based on the series of estimators and the targeted feature; selecting one of the candidate estimators as an estimator for the true probability distribution or relevant portion thereof for the targeted feature; and applying a mapping to the estimator for the true probability distribution or relevant portion thereof to obtain an estimated value for the targeted feature.

Note that for the purposes of the present discussion, an estimator of a true probability distribution does not necessarily refer to an estimator of an entire true probability distribution but may refer to an estimator of a portion or characteristic thereof. Similarly, a candidate estimator of a probability function may refer to a candidate estimator of a portion or characteristic of or all of a true probability distribution.

Hence, this embodiment provides a system for providing an improved targeted estimator of a probability distribution of a dataset via the use of iteratively enhanced estimates of one or more nuisance parameters to more reliably or accurately determine a target feature result, such as an answer to a question pertaining to the data.

A further understanding of the nature and the advantages of particular embodiments disclosed herein may be realized by reference of the remaining portions of the specification and the attached drawings.

BRIEF DESCRIPTION OF THE DRAWINGS

FIG. 8 is a flow diagram of a second example method adapted for use with the embodiments of FIGS. 1-2.

DESCRIPTION OF EMBODIMENTS

Figure 1:
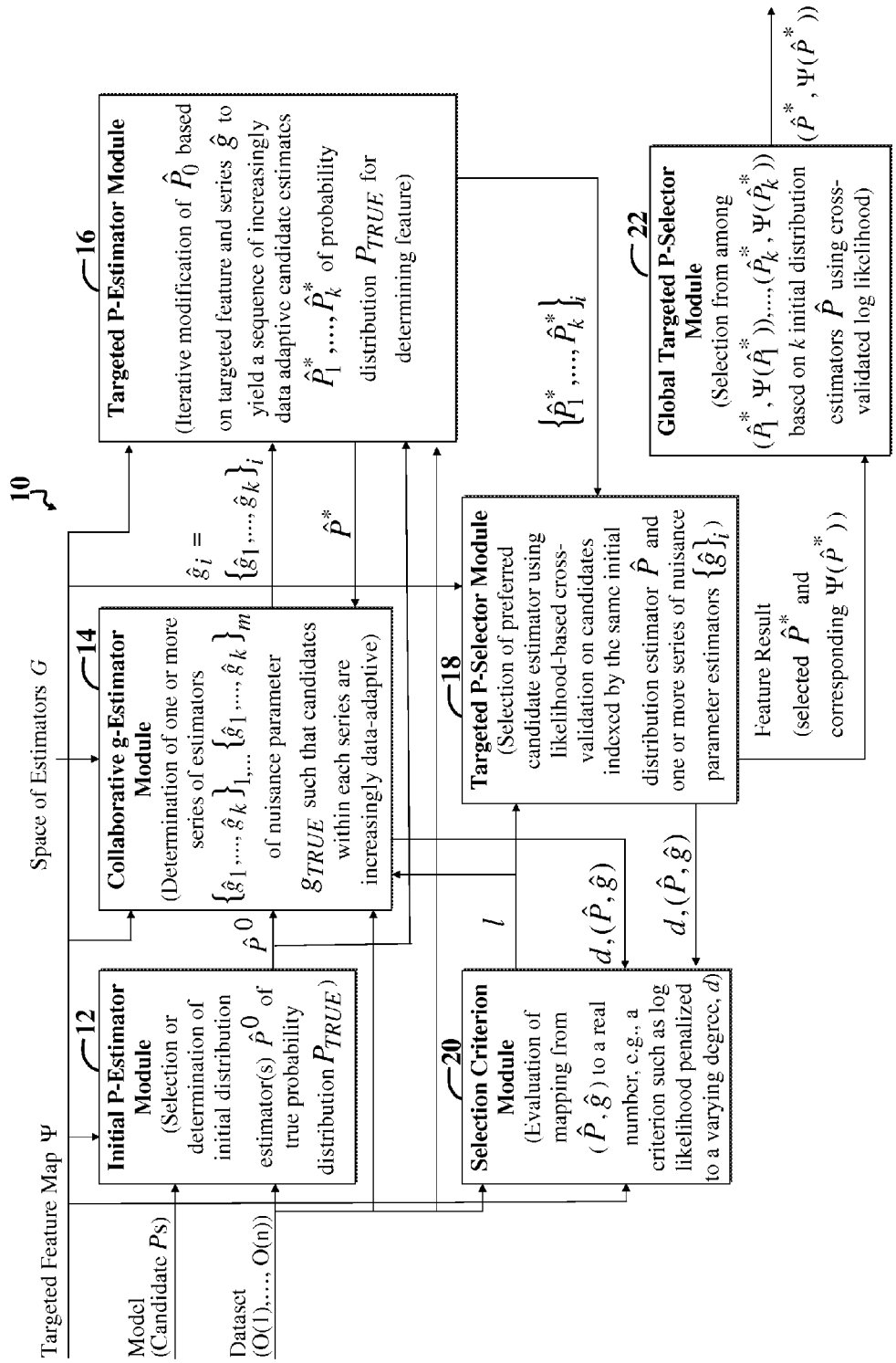
FIG. 1 depicts a system for providing an estimator of the relevant portion of the true probability distribution according to one embodiment and the result of applying a predetermined mapping to this estimator of the probability distribution in order to obtain an estimate of the value of a target parameter or feature.

Probability calculations often involve predicting outcomes based on known parameters (e.g. probabilities) or a known probability distribution, while likelihood calculations often involve determining a probability distribution (or parameters, such as probabilities) based on known data. In this case, candidate probability distributions based on and describing a set of data are called density estimators, likelihood estimators, P-estimators, or estimators of probability distributions. Mathematical descriptions of probability distributions are called probability density functions or simply density functions. Density estimators and their aimed density functions take similar forms if the density estimator is an accurate estimator of the density function.

A distribution estimator may be any distribution that estimates or approximates a true probability distribution of a dataset or portion or aspect thereof. A true distribution of a dataset may be a distribution that a dataset truly follows or behaves in accordance with. The terms distribution estimator, likelihood estimator, maximum likelihood estimator, density estimator, P-estimator, and estimator of a true probability distribution are employed interchangeably herein.

For the purposes of the present discussion, a density estimator is said to represent a "best fit" to data if the density estimator represents the density estimator that "most" accurately describes the data for a given feature of interest. The concept of "best" can be formalized by the notion that the estimator of the feature of interest is asymptotically efficient. Certain targeted P-estimators discussed herein, under regularity conditions, indeed yield locally asymptotically efficient estimators of the target feature. In some special cases, the targeted P-estimators discussed herein are even super-efficient.

Given a model for the true probability distribution of the data, an estimator of a target feature is called asymptotically efficient if the appropriately standardized difference between the estimator and its target feature is asymptotically normally distributed with mean zero and covariance matrix equal to the covariance matrix of the efficient influence curve of the target feature. Given a sub-model of the model, an estimator of a target feature is called locally efficient (with respect to the sub-model) if the estimator is an asymptotically efficient estimator of the target feature and if the true probability distribution is an element of the sub-model. The estimator remains a consistent and asymptotically linear estimation of the true probability distribution as long as the true probability distribution is an element of the model.

Maximum likelihood estimation involves determining a parameter that describes the density estimator making the observed data most probable. Generally, given a set of data, the likelihood of a given density estimator or parameter is equal to or proportional to the probability that the data occurred (e.g., experimental results occurred) given the density estimator or parameter. Hence, the density estimator or parameter with the maximum likelihood represents that density estimator or parameter estimate that makes the observed data most probable, i.e., the density estimator or parameter (e.g., probability) associated with the highest probability of the observed data. For the purposes of the present discussion, a parameter may be any value, function, or a combination of one or more values and/or one or more functions.

Take, for example, a coin-tossing experiment. The binomial random variable describes the probability (P) of obtaining h heads in n tosses of a coin:

$$P = \frac{n!}{h!(n-h)!} p^h (1-p)^{n-h}, \quad [1]$$

where p is the probability (p=0.5) of obtaining heads in a given coin toss. The variable p is also called the parameter for the experiment.

Suppose a coin is tossed 10 times (n=10), and 6 heads (h=6) and 4 tails are observed. This represents a dataset of 10 observations (n=10, h=6). The likelihood of obtaining 6 (h=6) heads when tossing a coin 10 times, and the coin is such that the probability on head is 50%, (p=0.5), is thus given by the formula:

$$L = \frac{10!}{6!(4)!} 0.5^6 (0.5)^4 \approx 0.205. \quad [2]$$

Example likelihood values for various values of p are tabulated below:

TABLE 1

| P | L |
|---|---|
| 0.4 | 0.111 |
| 0.5 | 0.205 |
| 0.6 | 0.251 |
| 0.7 | 0.200 |

L is equivalent to the probability that the experimental results were observed given various values of p, i.e., various values of the parameter. Similarly, the maximum likelihood value for L (L=0.251) represents the maximum probability that the experimental results were observed given various values of p, and occurs when p=0.6. The value of p=0.6 is called the maximum likelihood estimate of the true parameter value of p. In this case, the maximum likelihood estimate for p represents the proportion of heads occurring in the experiment, as expected.

When L is plotted as a function of p, it takes a shape with a peak at p=0.6 and L=0.251. When L at the maximum likelihood estimate p=0.6 is plotted as a function of h, it takes the shape of a binomial probability distribution (also called the probability density function of the binomial random variable with p=0.6). The resulting probability distribution is also called the density estimator or maximum likelihood estimator of the true probability distribution (which is binomial with p=0.5).

For the purposes of the present discussion, likelihood values may be any values representative of the likelihood of a given set of data or outcomes given a parameter or candidate probability distribution for the data. A log-likelihood may be any logarithm of a likelihood value, such as a base-10 or base-e logarithm (called the natural log). Accordingly, log-likelihood values are also considered to be likelihood values for the purposes of the present discussion.

Particular embodiments will be described in more detail now. Targeted maximum likelihood estimation (TMLE) provides efficient, unbiased likelihood-based estimation of a scientific parameter of interest in a non-parametric or semiparametric model.

Example embodiments of a TMLE are discussed more fully in co-pending U.S. patent application Ser. No. 11/867, 364, entitled TARGETED MAXIMUM LIKELIHOOD ESTIMATION, the teachings of which are incorporated by reference as if set forth fully herein.

TMLE builds upon traditional maximum likelihood estimation by applying a targeting maximum likelihood step to a particular fluctuation of an initial estimate of the probability distribution of the data or a function thereof, resulting in decreased bias in the estimate of the target parameter of interest. TMLE may be applied in studies of high-dimensional data in many settings, including the analysis of clinical trials data, survival analysis, safety analysis, and gene association studies. It is a general tool for estimating causal effects (e.g., risk difference, odds ratio, relative risk), correctly accounting for missing data, time-varying covariates, and other known biases in observational studies (selection bias, confounding by indication, etc.). Unbiased, efficient parameter estimation is a theoretical property of TMLE that dramatically affects real-world practices. For example, improved estimation can lead to fewer false positives in medical screening tests, decreasing the number of unnecessary follow-up medical procedures. Subgroup analysis with TMLE can determine effective personalized medicine practices, including optimal dynamic treatment regimes. Applications of TMLE in biomedical research and comparative effectiveness research involving the comparison of different drugs, devices, behaviors, treatment strategies (etc.) with respect to an outcome of interest (e.g., time till death, time till recurrence of cancer, etc), help to successfully rein in health care costs that in the United States alone are expected to reach $3.6 trillion by 2014.

Collaborative double robust targeted maximum likelihood estimation (C-DR-TMLE), as exemplified by certain embodiments discussed herein, provides a fundamental further advance of the targeted maximum likelihood estimation methodology, by providing a more robust and (still) optimal estimator of the target parameter in a non-parametric or semi-parametric model, thereby enhancing the practical finite sample performance relative to the targeted maximum likelihood estimator. Targeted maximum likelihood estimation involves estimation of a nuisance parameter in order to carry out the targeted maximum likelihood update step of the initial estimator of the probability distribution. C-DR-TMLE recognizes the collaborative double robustness property of targeted maximum likelihood estimation which states that it is possible to obtain an unbiased targeted maximum likelihood estimate of the parameter of interest by estimating only a portion of the nuisance parameter, where this portion depends on the remaining bias of the initial estimator of the probability distribution. In particular, as illustration, if the initial estimator is already unbiased, then there is no need to estimate any nuisance parameter, and in the other extreme case that the initial estimator is completely mis-specified, then one needs to obtain a valid estimator of the complete nuisance parameter. In the C-DR-TMLE the appropriate nuisance parameter fit is determined data-adaptively, and varies in response to the fit of the initial first-stage probability distribution estimate.

For clarity, various well-known components, such as power supplies, computer operating systems, user interfaces, and so on have been omitted from the figures. However, those skilled in the art with access to the present teachings will know which components to implement and how to implement them to meet the needs of a given application.

FIG. 1 depicts a system 10 for providing an estimator of a relevant portion of a true probability distribution of a dataset according to one embodiment. In particular, the system 10 provides a selected targeted distribution estimator ($\hat{P}^*$) and the result of applying a corresponding targeted feature map ($\Psi$) to the targeted distribution estimator $\hat{P}^*$ in order to obtain answer(s) to, i.e., estimate(s) of, one or more particular features of interest to which the distribution is targeted, as discussed more fully below.

For the purposes of the present discussion, a feature of interest, also called targeted feature or target feature or target parameter, may be any information of interest pertaining to a dataset or corresponding probability distribution. A feature generally corresponds to a question pertaining to a dataset.

The feature is often the objective or target of analysis. An estimator is said to be targeted to the feature if it is tailored to yield a good estimator of the target feature. For example, the analysis may be concerned with the odds of a cancer patient surviving beyond twenty-eight years after a given cancer treatment. Another example feature may be the effect of a certain gene on the probability of recurrence of a certain type of cancer. The latter probability distribution may include one or more additional variables pertaining to the effects of the gene. A component of data may be any contributing factor to a dataset, which may include experimental results or observations.

Specifically, the term "feature of interest" or "target feature" discussed herein may correspond to a value of a scientific parameter, where the scientific parameter is defined by a mapping that is applied to a probability distribution to find a value or result for the target feature. The scientific parameter corresponds to a target feature map $\Psi$. In the present embodiment, the target feature map $\Psi$ may be a pathwise differentiable finite dimensional parameter or function of a probability distribution, where the target feature map is well defined over the model or likelihood estimator used to estimate a true probability distribution for a dataset. The pathwise derivative of $\Psi$ applied to the true probability distribution characterizing the dataset corresponds to or is identified by an efficient influence curve at this true probability distribution, as discussed more fully below.

The system 10 may be implemented via software and/or hardware and may include one or more functions that are distributed among one or more computing devices. The system 10 includes an initial P-estimator module 12 in communication with a collaborative g-estimator module 14. The g-estimator module 14 further communicates with a targeted P-estimator module 16 and a selection criterion module 18. The targeted P-estimator module 16 further communicates with a targeted P-selector module 20. The targeted P-selector module 20 further communicates with a global targeted P-selector module 22 and the selection criterion module 18.

In the present example embodiment, the initial P-estimator module 12 receives model candidate probability distributions (Ps), a dataset (O(1), ..., O(n)), and a targeted feature map $\Psi$ as input thereto to facilitate selecting or determining one or more initial distribution estimators $\hat{P}$ of a true probability distribution ($P_{TRUE}$) that are potentially already tailored to result in good estimates $\Psi(\hat{P})$ of the true target feature $\Psi(P_{TRUE})$.

The input a dataset, denoted {O(n)}, represents n experimental results or observations. The dataset {O(n)} may include n observations on a random variable O, which are also called data structures: O(1), . . . , O(n). The dataset is also simply called the data herein. The dataset is characterized by the true probability distribution $P_{TRUE}$, which for the purposes of the present discussion is initially unknown for given dataset, but might be known to be an element of a certain specified model, i.e., an element of a set of possible probability distributions of the data. For example, the true distribution of a given dataset might be the Gaussian distribution, however, this might not be initially known.

The feature map $\Psi$ represents input information characterizing a feature of interest, which is the target feature representing the target of analysis performed by the system 10. Formally, the feature map $\Psi$ maps any probability distribution in the model to one or more real numbers. In the present embodiment, this information is conveyed to the initial P-estimator 12 via the target feature map $\Psi$.

The input candidate probability distributions (Ps) comprise a model. For the purposes of the present discussion, a model may be a set of possible (or candidate) probability distributions, and a given model may include the true probability distribution $P_{TRUE}$. The candidate probability distributions (Ps) represent candidates of the true probability distribution $P_{TRUE}$ of the dataset {O(n)}, which is the distribution that a dataset actually follows or behaves in accordance with.

The dataset {O(n)} and the targeted feature map $\Psi$ are also input to the collaborative g-estimator module 14 and the targeted P-estimator module 16. The dataset {O(n)} is also input to the selection criterion module 20. The feature map $\Psi$ is also input to the targeted P-selector module 18 to enable the targeted P-selector module 18 to provide a feature result to the global targeted P-selector module 22, as discussed more fully below.

Note that the targeted feature map $\Psi$ applied to probability distribution P is also denoted $\Psi(P)$, where P is a probability distribution that is mapped by $\Psi$. The feature map $\Psi$ represents a mapping function defined on the model. The feature map $\Psi$ yields the targeted feature when applied to the true probability distribution $P_{TRUE}$, such that $\Psi(P_{TRUE})$ yields the true answer or result, called the true feature result, pertaining to the target feature. The feature result represents an answer to a question sought, wherein the question sought pertains to the target feature.

For example, in an experiment wherein the information sought is the probability of a medical patient surviving beyond twenty-five years after treatment, $\Psi(P_{TRUE})$ would yield actual probability of a patient surviving beyond twenty-five years. This probability corresponds to the area under a curve defined by the density of $P_{TRUE}$ to the right of twenty-eight years, as discussed more fully below. The feature map $\Psi$ is also called the targeted parameter mapping.

The initial P-estimator module 12 includes instructions for employing the feature map $\Psi$, the dataset {O(n)}, and the distribution model (Ps) to determine a set of one or more initial distribution estimators, where an initial distribution estimator is denoted by $\hat{P}$. The initial distribution estimator $\hat{P}$ is input to the collaborative g-estimator module 14.

The collaborative g-estimator module 14 employs one or more initial distribution estimators $\hat{P}$, the targeted feature map $\Psi$, any applicable penalized log-likelihood value(s) (l) from the selection criterion module 20, and an initial space of estimators (G). As discussed herein, a log-likelihood value l output from the selection criterion module 20 is a real number representing the result of a predetermined mapping from a pairing $(\hat{P},\hat{g})$ of an initial distribution estimator or any other candidate distribution estimator (as considered in the collaborative g-estimator module 14) $\hat{P}$ and a corresponding candidate nuisance parameter $\hat{g}$ that has been indexed to the given initial distribution estimator $\hat{P}$. The predetermined mapping implemented by the selection criterion module 20 is in accordance with one or more predetermined selection criteria, as discussed more fully below. In one embodiment the value assigned to such a pairing $(\hat{P},\hat{g})$ might be the penalized log-likelihood of the targeted maximum likelihood estimator that updates the $\hat{P}$ using $\hat{g}$ as estimator of the nuisance parameter in the targeted maximum likelihood update.

Inputs to the collaborative g-estimator module 14 are used thereby to obtain one or more series of estimators (where m such series are denoted $\{\hat{g}_1, \ldots, \hat{g}_k\}_1, \ldots \{\hat{g}_1, \ldots, \hat{g}_k\}_m$) for a true nuisance-parameter distribution, denoted $g_{TRUE}$. For the purposes of the present discussion, a nuisance parameter may be any parameter of a probability distribution of the data that is helpful for obtaining more accurate or unbiased estimators of the target feature, different from the parameter the P-estimator is estimating. Typically, the phrase nuisance parameter is used to describe parameters of the probability distribution of the data that are not directly needed to evaluate the target parameter, but there are also many cases where the target parameter is a function of portions of the true probability distribution $P_{TRUE}$, including the nuisance parameter. For example, $\Psi(P_{TRUE})$ might depend on the portion of the true probability distribution the P-estimator is estimating, and might depend on $g_{TRUE}$.

Generally, a nuisance parameter may be any censoring or treatment mechanism, i.e., conditional probability distributions of censoring or missing or treatment assignments that can be derived from the true probability distribution, such as a distribution or function, that is used to address, account for, or compensate for an initially unknown or uncharacterized factor affecting a distribution of data. A censoring mechanism may be any mechanism used to ascertain or characterize how much is observed on a set of variables of interest, that is only observable under certain conditions or that may otherwise be partly or completely missing from the readily observable data. A censored observed data structure on one unit is described as a particular known function of the variables of interest (also called the full data structure) and censoring variables. The censoring mechanism would then constitute a conditional probability distribution of the censoring variables, as can be computed from the true complete probability distribution of the data.

An example of a full data structure of interest is hours worked by a citizen, augmented with additional characteristics of the citizen (e.g., age, education, etc), while the observed data structure on the citizen only collects the hours worked if the citizen is employed, and the hours worked for an unemployed citizen might be missing, but the observed data structure always includes the additional characteristics. In this model, estimators targeted for the population average hours worked may be biased by the "unknown" hours worked by the unemployed. A nuisance parameter addressing the mechanism for assigning missingness to the full data structure of a citizen may be employed to improve the targeting of the estimator.

Generally, the choice of estimator of the nuisance parameter discussed herein may affect the accuracy or bias or rate of convergence of the target feature mapping applied to the targeted P-estimator, with respect to the true target feature of the probability distribution.

The collaborative g-estimator module 14 initially employs the initial space of estimators (G) and the initial estimator $\hat{P}$ provided by the initial P-estimator module 12 to obtain initial sets $(\hat{g}_i=\{\hat{g}_1, \ldots, \hat{g}_k\}_i)$ of estimators (g-estimators) of a nuisance parameter, which are provided to the targeted P-estimator module 16. To obtain subsequent sets of g-estimators, the collaborative g-estimator module 14 employs one or more selected modified estimates $\hat{P}^*$ from the targeted P-estimator module 16, as discussed more fully below. The process iteratively continues, whereby the collaborative g-estimator module 14 continues to provide new updated estimates of the nuisance parameter $g_{TRUE}$, and the targeted P-estimator module 16 continues to use the updates to provide subsequent modified estimates back to the collaborative g-Estimator module 14. This results in sequences of increasingly data-adaptive estimates of the nuisance parameter $g_{TRUE}$ provided by the collaborative g-estimator module 14 and one or more sequences or series of increasingly data-adaptive candidate estimates $(\hat{P}_1^*, \ldots, \hat{P}_k^*)$ provided by the targeted P-estimator module 16. Each candidate estimate $\hat{P}^*$ is based on or is otherwise associated with a particular g-estimator $\hat{g}$. A given candidate estimate $\hat{P}^*$ is said to be indexed by an associated estimator $\hat{g}$ of the nuisance parameter $g_{TRUE}$. In one embodiment $\hat{P}^*$ is a targeted maximum likelihood update of a particular P-estimator using $\hat{g}$ as nuisance parameter estimator in the targeted maximum likelihood update step.

The collaborative g-estimator module 14 may use the log-likelihood value l output from the selection criterion module 20 to facilitate updating g-estimators, such that likelihood based cross-validation is used to select the nuisance parameter estimator for which the targeted maximum step (performed by the targeted P-estimator module 16) yields the maximally effective bias reduction with respect to the target parameter. The log likelihood value l may be penalized to a varying degree (d) so that modifications, i.e., updates to targeted maximum likelihood estimators $\hat{P}$, as performed by the targeted P-estimator module 16, results in updates that are increasingly more targeted toward the parameter or feature of interest.

Note that the nuisance parameter estimators (g-estimators) used by the targeted maximum likelihood P-estimator module 16 are now based on the log-likelihood of the resulting targeted maximum likelihood estimators $\hat{P}^*$, and consequently, the resulting estimators $\hat{P}^*$ of the target parameter output by the targeted P-estimator module 16 are substantially likelihood based.

Hence, a feedback loop formed between the collaborative g-Estimator module 14 and the targeted P-estimator module 16 may be exploited to facilitate iterative modification of an estimator (g-estimator) of a nuisance parameter $g_{TRUE}$ and a series of g-estimators, where candidates within each series are increasingly data-adaptive. Similarly, this feedback facilitates iterative modification of a distribution estimator $\hat{P}$ to yield a series of updated or modified candidate $\hat{P}_1^*, \ldots, \hat{P}_k^*$ where candidates within each series are increasingly data-adaptive.

For the purposes of the present discussion, a second estimator in a series of estimators is said to be more data-adaptive than a first estimator in the series if the second estimator exhibits a better fit to data of a dataset (in accordance with one or more predetermined criteria) than the first estimator. Exact criteria for determining a fit of an estimator to data are application specific. Specific examples of criteria for determining a fit of an estimator to data are discussed more fully below. Those skilled in the art with access to the present teachings may readily determine appropriate criteria for measuring an estimator's fit to data without undue experimentation. Similarly, a series of estimators are said to be increasingly data-adaptive if subsequent estimators in the series are characterized by a better fit to data or a better fit to a true distribution of the data than previous estimators of the series.

The targeted P-estimator module 16 employs the feature map $\Psi$, one or more g-estimators ($\hat{g}_i = \{\hat{g}_1, \ldots, \hat{g}_k\}_i$) output from the collaborative g-estimator module 14, the initial estimator $\hat{P}$, and the dataset $\{O(n)\}$, and optionally, feedback between the collaborative g-estimator module 14 and the targeted p-estimator module 16, to iteratively modify the initial estimator $\hat{P}$. This iterative modification yields a sequence of increasingly data-adaptive candidate estimates $\hat{P}_1^*, \ldots, \hat{P}_k^*$ of the true probability distribution $P_{TRUE}$ underlying the data $\{O(n)\}$. A highly adapted candidate estimate, e.g., $\hat{P}_k^*$, may be used to relatively accurately determine, ascertain, or otherwise estimate a desired feature of interest. Note that in general, in accordance with the notation used herein, a subsequent candidate estimate $\hat{P}_{k+1}^*$ may represent a targeted maximum likelihood estimator that updates a previous estimator, $\hat{P}_j^*$, where j=1, ..., k, in the sequence, using an estimator $\hat{g}_{k+1}$ of the nuisance parameter $g_{TRUE}$ in the targeted maximum likelihood update step.

The targeted P-estimator module 16 takes as input the sequence of nuisance parameter estimates and outputs a series of corresponding targeted estimates $\{\hat{P}_1^*, \ldots, \hat{P}_k^*\}_i$, which forms an input for the targeted P-selector module 18.

The targeted P-selector module 18 then selects a preferred candidate estimator from among the targeted estimates $\{\hat{P}_1^*, \ldots, \hat{P}_k^*\}_i$ in accordance with a first selection method. In the present embodiment, the first selection method includes using likelihood-based cross-validation to select among these k candidates for the i-th series, where each one is paired with a nuisance parameter estimator in the series $\{\hat{g}\}_i$, and the same selection method may also be used to select the choice of series i. Exact details of cross-validation methods are application specific. Those skilled in the art with access to the present teachings may readily determine appropriate details to meet the needs of a given implementation without undue experimentation.

For the purposes of the present discussion, the process of cross-validation may be any process involving partitioning a set of values or parameters into subsets, such that analysis is initially performed on a single subset, while the other subset(s) are retained for use in confirming and validating the initial analysis. The initial subset of values or parameters is called the training set, while the remaining subset(s) is called the validation or testing set.

In an example embodiment, likelihood-based cross-validation is used to select the nuisance parameter estimator (g-estimator) and associated targeted estimator $\hat{P}^*$, among the candidates $\hat{P}_1^*, \ldots, \hat{P}_k^*$, for which bias with respect to a target parameter is minimum, such that the targeted estimator $\hat{P}^*$ may be more effective at obtaining answers pertaining to features or questions of interest. The targeted P-selector module 18 may implement a loss function to evaluate candidate targeted maximum likelihood estimators $\hat{P}^*$ by applying cross-validation.

Generally, tests have shown that employing the log likelihood of a targeted maximum likelihood estimator as a criterion to select among different targeted maximum likelihood estimators, which are possibly indexed by different candidate estimators of the nuisance parameters (e.g., censoring mechanism), provides significant results.

Use of targeted penalized log-likelihood based criterion may provide further benefits when selecting from among targeted maximum likelihood estimators that are indexed by different choices for the nuisance parameter estimator (g-estimator). One possible penalty accounts for an estimate of a mean squared error of the target mapping applied to the candidate targeted maximum likelihood estimator relative to its limit, which can be obtained as an empirical covariance matrix of the efficient influence curve of the parameter of interest at the candidate targeted maximum likelihood estimator. In addition, the penalty may also account for a biased estimate of the candidate targeted maximum likelihood estimator.

In accordance with the present embodiment, when a penalty is applied to a likelihood criteria, the likelihood criteria is said to be penalized, wherein a penalty applied to the likelihood criteria may be determined based on an estimate of the mean square error of the candidate estimators of the probability distribution for the targeted feature.

The targeted P-selector module 18 subsequently outputs a feature result $\Psi(\hat{P}^*)$ that is a function of and associated chosen, i.e., preferred candidate targeted estimator $\hat{P}^*$. The preferred candidate estimator $\hat{P}^*$ and the feature result $\Psi(\hat{P}^*)$ represent a pair that is input to the global targeted P-selector module 22.

The global targeted P-selector module 22 collects several pairs of preferred candidate estimators and corresponding feature results output by the targeted P-selector module 18, where the pairs are denoted $(\hat{P}_1^*, \Psi(\hat{P}_1^*)), \ldots, (\hat{P}_k^*, \Psi(\hat{P}_k))$. The global targeted P-selector module 22 then selects a particular pair from the pairs using second predetermined method. In the present example embodiment, the second predetermined method includes a method that employs cross-validated log likelihood or cross-validated penalized log-likelihood. In another present example embodiment, the second predetermined method includes a method that selects the estimator that has the smallest estimator of its mean squared error for the target feature, which can be estimated with the variance of the influence curve of the estimator. Exact details of the second predetermined method are application specific. Those skilled in the art with access to the present teachings may readily determine appropriate method details to meet the needs of a given implementation without undue experimentation.

The general method of cross-validation provides a tool to select among candidate estimators. It involves splitting the sample in training sample and corresponding validation sample. The candidate estimators are trained on the training sample and their performance is measured on the validation sample. This is carried out across different splits in training and validation sample and one evaluates the performance of a candidate estimator as the average performance across the different validation samples. One then selects the candidate estimators that have the best performance. The measure of performance on the validation sample may be defined as an average of a specified loss function at the candidate estimator, trained on the corresponding training sample, over the observations in the validation sample. One particular choice of loss function used for density estimators is the minus log of the density estimator evaluated at the observation, also called the log-likelihood loss function.

In summary, the initial P-estimator module 12 is configured to receive model candidate P-estimators (Ps) and a dataset $\{O(n)\}$. The candidate P-estimators may be density estimators, likelihood estimators, P-estimators, estimators of a function of the probability distribution, or estimators of probability distributions. The candidate P-estimators estimate or approximate a true probability distribution of the dataset $\{O(n)\}$ or portion of the true probability distribution characterizing the data.

For the purposes of the present discussion, it is understood that P-estimators can refer to an estimator of any function of a true probability distribution. A true distribution of a data set may be a distribution that a data set truly follows or behaves in accordance with. The candidate P-estimators represent initial distribution estimators of the true probability distribution $P_{TRUE}$.

Initial P-estimator module 12 is configured to select or determine one or more initial distribution estimators $\hat{P}$ of the true probability distribution $P_{TRUE}$. For clarity, the remainder of the discussion is written as if there is only one initial estimator $\hat{P}$. The procedure would be carried out for each initial $\hat{P}$ independently, and the global selector module 22 would select among them.

The collaborative g-estimator module 14 determines one or more series of increasingly non-parametric estimators $(\hat{g}_k)$ of nuisance parameter $g_{TRUE}$. The collaborative g-estimator module 14 uses the initial distribution estimator $\hat{P}$ to determine the one (m=1) or more series of g-estimators $(\{\hat{g}_1, \ldots, \hat{g}_k\}_1, \ldots \{\hat{g}_1, \ldots, \hat{g}_k\}_m)$.

The g-estimators may be estimators of a nuisance parameter. A given series of g-estimators is determined by iteratively constructing and evaluating targeted maximum likelihood estimators indexed by candidate g-estimators more data-adaptive than a previously selected g-estimator, and selecting a best g-estimator among these candidate g-estimators, to determine a series of g-estimators that are increasingly data-adaptive. Data adaptivity of a g-estimator can be measured by some empirical criterion measuring the empirical fit of the g-estimator such as a log likelihood or an estimator of the variance of the efficient influence curve of the target parameter at this g-estimator and a particular P-estimator. One way to measure adaptivity of a g-estimator (that is targeted towards the target parameter) is to measure it by an estimate of the variance of the corresponding targeted maximum likelihood estimator of the target parameter, where this targeted maximum likelihood estimator updates an initial P-estimator using this g-estimator in the targeted maximum likelihood update step. This estimate can be obtained by estimating the variance of the efficient influence curve at this g-estimator and this initial P-estimator. This results in a series of g-estimators that are output. This process will be described in more detail below.

The targeted P-estimator module 16 is configured to determine a sequence of increasingly data-adaptive candidate estimators $\hat{P}_1^*, \ldots, \hat{P}_k^*$ of the probability distribution $P_{TRUE}$ for determining a target feature, where these estimators are indexed by the nuisance parameter estimators $\hat{g}_1, \ldots, \hat{g}_k$, respectively. A series of $\hat{P}_k^*$ estimators is determined based on the series of g-estimators and the initial $\hat{P}^0$ estimator. For example, a targeted maximum likelihood estimator is constructed based on the targeted feature, a P-estimator, and one of the series of g-estimators. This yields a targeted maximum likelihood estimator $\hat{P}^*$. This process is repeated to determine a series of $\hat{P}^*$ estimators.

In one particular embodiment the iterative determination of the candidate $\hat{P}^*$ estimators is determined where a $\hat{P}_{k+1}^*$ is an update of $\hat{P}_k^*$ that uses $\hat{g}_{k+1}$ to carry out this update. This process iteratively continues to continuously generate $\hat{P}^*$ estimators. The output series of data-adaptive candidate estimators $\hat{P}_1^*, \ldots, \hat{P}_k^*$ is then input into a targeted P-selector module 18. In another embodiment one P-estimator (e.g., one element in the sequence) can give rise to several updates, thereby generating more than one $\hat{P}_{k+1}^*$ from a single $\hat{P}_k^*$ and several $\hat{g}^*$. In this case, the j-th element in the sequence of $\hat{P}_1^*, \ldots, \hat{P}_k^*$ represents an update of a particular earlier element (say z-th, z in 1, . . . , j−1) in the sequence, but not necessarily the previous one (i.e., not necessarily z=j−1).

The targeted P-selector module 18 is configured to select a candidate $\hat{P}^*$ estimator using a criterion, such as a likelihood criterion. The targeted P-selector module 18 may use cross-validation on the candidates indexed by the same initial density estimator $\hat{P}$ and one or more series of nuisance parameter estimators $\{\hat{g}\}_i$ to determine the selected P-estimator.

Targeted P-selector module 18 uses a selection criterion, which may be determined by the selection criterion module 20. The selection criterion module 20 evaluates a mapping from $(\hat{P},\hat{g})$ to a real number (e.g., a log likelihood penalized to a varying degree of d). In this evaluation, the actual algorithm that resulted in the candidate $(\hat{P},\hat{g})$ might be taken into account, as is common in cross-validation. The criteria of d, $(\hat{P},\hat{g})$ may be penalized based on how a $\hat{P}$ estimator estimates the target feature $\psi_{TRUE}=\Psi(P_{TRUE})$ the target feature mapping $\Psi$. The target feature $\psi_{TRUE}$ is a function of the true probability distribution of the data, where the target feature map is well-defined over the set of possible probability distributions, including candidate P-estimators. If $\Psi$ is pathwise differentiable, the pathwise derivative of $\Psi$ at the true probability distribution characterizing the data set corresponds to or is identified by an efficient influence curve at this true probability distribution.

For the purposes of the present discussion, an efficient influence curve may be defined at each probability distribution in a model that includes a set of one or more candidate probability distributions. The efficient influence curve equation implemented by the targeted P-estimator module 18 is given by:

$$0=D^*(P)(O(1))+\ldots+D^*(P)(O(n)),\quad [3]$$

where P is a candidate modified density estimator, such as $\hat{P}^*$; where $D^*(P)$ is an efficient influence curve evaluated at P for the target feature (e.g., $\Psi$), also called the target parameter; and where $O(n)$ represents an n-th observation, where n is an integer; and where $D^*(P)(O(n))$ represents $D^*(P)$ applied to an observation $O(n)$.

The efficient influence curve at the probability distribution P, denoted $D^*(P)$, may be interpreted heuristically as a curve such that $D^*(P_{TRUE})$ applied to an observation O is an extraction of this observation O that captures all the relevant information to estimate efficiently the target parameter $\Psi(P_{TRUE})$, i.e., the true answer or result pertaining to the target feature. In one example, the relevant information pertains to a medical patient's survival time surpassing twenty-five years.

Criterion for choosing $\hat{g}^*$, and thereby $\hat{P}^*$, is determined collaboratively based on the performance of the initial estimator $\hat{P}$. For example, when the initial $\hat{P}$ is a good estimator of $P_{TRUE}$, an unbiased estimator $\hat{g}$ of the true $g_{TRUE}$ may not be needed. However, if the initial $\hat{P}$ is a bad estimator of $P_{TRUE}$, an unbiased $\hat{g}$ may result in better $\hat{P}^*$ estimators.

The targeted P-selector module 18 outputs a feature result of the selected $\hat{P}^*$ and a corresponding targeted feature mapping $\Psi(\hat{P}^*)$. Multiple $\Psi(\hat{P}^*)$ may be determined. The global targeted P-selector module 22 selects among $(\hat{P}_1^*, \Psi(\hat{P}_1^*)), \ldots, (\hat{P}_k^*, \Psi(\hat{P}_k^*))$ based on N initial P-estimators $\hat{P}^0$ using cross-validated penalized log likelihood or another cross-validated empirical criterion applied to $\hat{P}^*$. This selection is determined if multiple $\hat{P}$ are being estimated. For example, multiple $\hat{P}$ may be output by initial P-estimator module 12, and multiple series of $\hat{g}$ estimators may be determined.

The present example embodiment attempts to construct a good estimator of $\Psi(P_{TRUE})$ with a substitution estimator $\Psi(\hat{P}^*)$ to yield an unbiased, accurate feature result with little or no variance. This is done by first constructing good (small variance) initial estimator $\hat{P}$ (which may be more biased that desired for obtaining the feature result), and then modifying $\hat{P}$, thereby removing bias therefrom (as much as the data allows) for obtaining the target feature result. The resulting $\hat{P}^*$ does not necessarily yield a completely unbiased feature result upon application of the feature map $\Psi$. However, the resulting estimate of $\Psi(P_{TRUE})$, i.e., $\Psi(\hat{P}^*)$, is relatively close to $\Psi(P_{TRUE})$, but may include some bias and variance.

Figure 2:
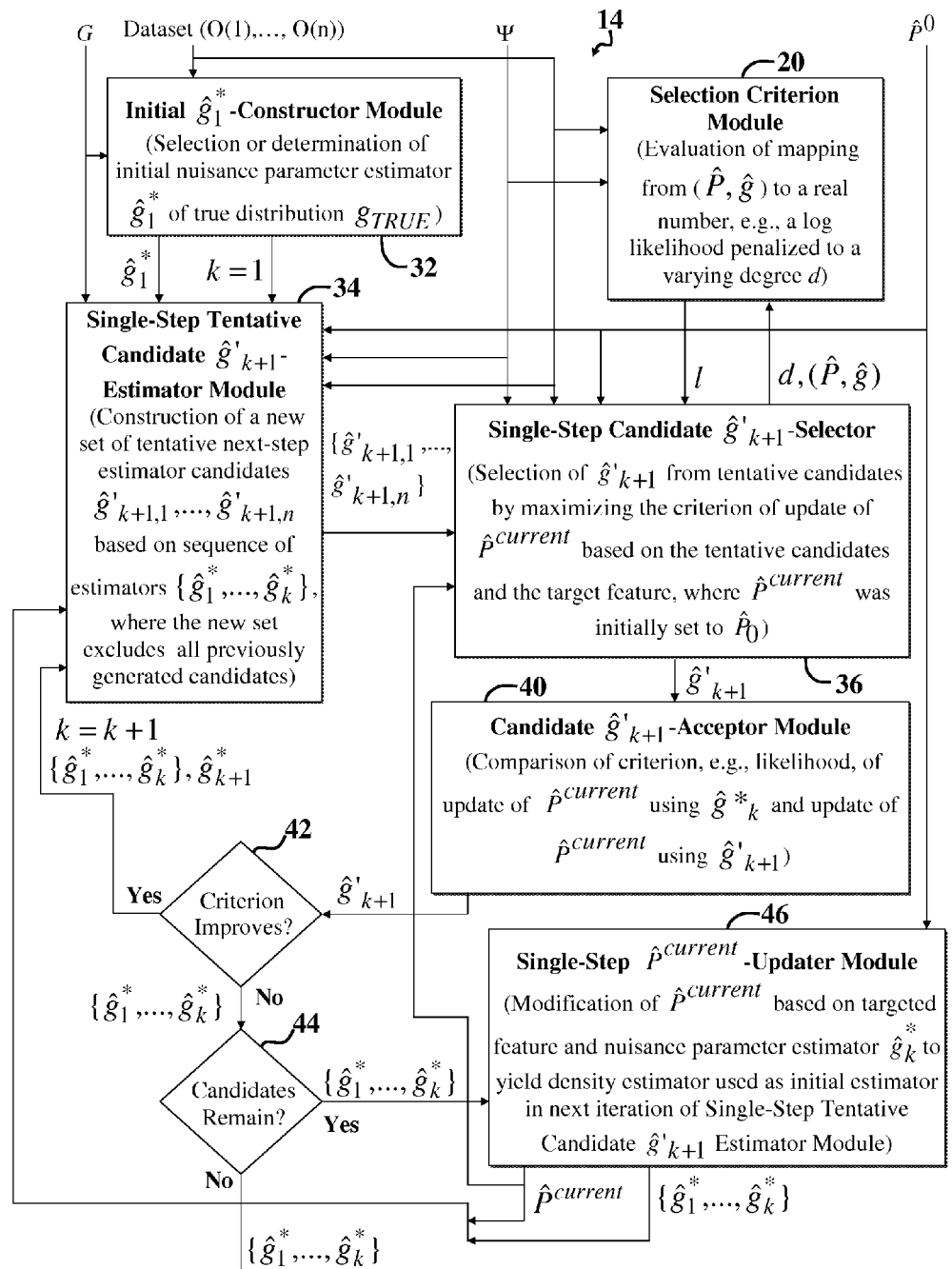
FIG. 2 depicts a more detailed example of the collaborative g-estimator module of FIG. 1 for determining a series of g-estimators, where g denotes a nuisance parameter.

FIG. 2 depicts a more detailed example of the collaborative g-estimator module 14 of FIG. 1 for determining g-estimators, where g denotes a nuisance parameter. The collaborative g-estimator module 14 includes an initial $\hat{g}_1^*$-constructor module 32, which communicates with a single-step tentative candidate $\hat{g}'_{k+1}$-estimator module 34, where initially k=1. The single-step tentative candidate $\hat{g}'_{k+1}$-estimator module 34 communicates with a single-step candidate $\hat{g}'_{k+1}$-selector module 36, which communicates with the candidate $\hat{g}'_{k+1}$ acceptor module 40. A first decision mechanism 42 is coupled between an output of the candidate $\hat{g}'_{k+1}$ acceptor module 40 and an input of single-step tentative candidate $\hat{g}'_{k+1}$-estimator module 34. A second output of the first decision mechanism 42 is coupled to an input of a second decision mechanism 44, a first output of which is input to a single-step $\hat{P}^{current}$-updater module 46, and a second output of which provides the output of the collaborative g-estimator module 14. Certain output from the single-step $\hat{P}^{current}$-updater module 46 is fed back to the single-step tentative candidate $\hat{g}'_{k+1}$-estimator module 34 and to the single-step candidate $\hat{g}'_{k+1}$-selector module 36. A selection criterion module 20 communicates with single-step candidate $\hat{g}'_{k+1}$-selector module 36.

A first feedback loop forms between the modules 34, 36, 40, 42, and a second feedback loop forms between the modules 34, 36, 40, 42, 44, 46, 34. These feedback loops facilitate iterative updating of g-estimators to yield an output sequence of progressively data-adaptive g-estimators $\{\hat{g}_1^*, \ldots, \hat{g}_k^*\}$ of the nuisance parameter $g_{TRUE}$, as discussed more fully below.

In operation the initial $\hat{g}_1^*$-constructor module 32 employs the dataset $\{O(n)\}$ and model space G to select or otherwise determine an initial nuisance parameter estimator $\hat{g}_1^*$ of true distribution $g_{TRUE}$.

The initial nuisance parameter estimator $\hat{g}_1^*$ is input to the single-step tentative candidate $\hat{g}'_{k+1}$-estimator module 34. The module 34 also receives a space of estimators G as input thereto. The space G may include a desired model of nuisance parameters. The exact choice of the space G is application specific and may readily be determined by those skilled in the art with access to the present teachings to meet the needs of a given application without undue experimentation.

The single-step tentative candidate $\hat{g}'_{k+1}$-estimator module 34 employs the initial nuisance parameter estimator $\hat{g}_1^*$ and any available subsequent estimators (e.g., $\{\hat{g}_1^*, \ldots, \hat{g}_k^*\}$), to construct a set of tentative next-step candidate estimators $(\hat{g}'_{k+1,1}, \ldots, \hat{g}'_{k+1,n})$ that is more data-adaptive than previously generated candidates, and therefore excludes all previously generated candidates.

The single-step candidate $\hat{g}'_{k+1}$-selector module 36 selects a preferred candidate estimator $(\hat{g}'_{k+1})$ from among next-step candidate estimators $(\hat{g}'_{k+1,1}, \ldots, \hat{g}'_{k+1,n})$ based on a predetermined selection method. In the present embodiment, the selection method includes maximizing the likelihood of updated initial distribution estimator (denoted $\hat{P}^{current}$) based on the tentative nuisance parameter candidates (provided by the single-step tentative candidate $\hat{g}'_{k+1}$-estimator module 34) and the target feature $\Psi$. Note that the likelihood is possibly penalized, depending upon the input parameter d provided as input to the selection criterion module 20. Furthermore, note that the initial distribution estimators $\hat{P}^{current}$ may be obtained via the single-step $\hat{P}^{current}$-updater module 46, as discussed more fully below, and is initially set to $\hat{P}^0$ at the start of the process.

Candidate $\hat{g}'_{k+1}$-acceptor module 40 uses a criterion to compare the utility of candidate $\hat{g}'_{k+1}$ with the previously selected $\hat{g}_k^*$ in the sequence. In one particular embodiment this criterion may be based on a comparison of the likelihood of an update of $\hat{P}^{current}$ using $\hat{g}'_{k+1}$ with the likelihood of an update of $\hat{P}^{current}$ using $\hat{g}_k^*$, the candidate model for g constructed in the previous step. This criterion may optionally include penalized log-likelihood discussed above, such as an estimate of the mean squared error for the target feature. Candidate $\hat{g}'_{k+1}$ is input to the first decision mechanism 42.

The first decision mechanism 42 determines if the likelihood of $\hat{g}'_{k+1}$ has increased as compared to a previous version $\hat{g}_k^*$. If the likelihood has increased, additional iteration is performed, and the latest estimators $\{\hat{g}_1^*, \ldots, \hat{g}_k^*\}, \hat{g}_{k+1}^*$ are fed back to the single-step tentative candidate $\hat{g}'_{k+1}$-estimator module 34 for further iteration and refinement.

If the likelihood has not increased, then the series of previously accepted estimators is forwarded to the second decision module 44. The second decision module 44 checks if any candidates remain to be constructed and processed. If no candidates remain, then the most updated sequence of estimators $\{\hat{g}_1^*, \ldots, \hat{g}_k^*\}$ is output from the collaborative g-estimator module 14. If candidates remain to be processed, the latest estimators $\{\hat{g}_1^*, \ldots, \hat{g}_k^*\}$ are forwarded to the single-step $\hat{P}^{current}$-updater module 46.

The single-step $\hat{P}^{current}$-updater module 46 modifies the latest distribution estimator $\hat{P}^{current}$ based on targeted feature $\Psi$ and nuisance parameter estimator $\hat{g}_k^*$ to yield a density estimator that is used as an initial estimator (i.e., the estimator that is updated with targeted maximum likelihood estimation using a nuisance parameter estimator in the TMLE update step) in next iteration of single-step tentative candidate $\hat{g}'_{k+1}$-estimator module 34.

In summary, the initial $\hat{g}_1^*$-constructor module 32 is configured to select or determine an initial nuisance parameter estimator $\hat{g}_1^*$ of the true distribution $g_{TRUE}$. One sets k=1. The single-step tentative candidate $\hat{g}'_{k+1}$-estimator module 34 constructs a set of tentative next-step estimator candidates $\hat{g}'_{k+1,1}$ through $\hat{g}'_{k+1,n}$ and based on a sequence of estimators $\{\hat{g}_1^*, \ldots, \hat{g}_k^*\}$, excluding all previously generated candidates. This series is then put into single-step candidate $\hat{g}'_{k+1}$-selector module 36, which selects $\hat{g}_{k+1}^*$ from the tentative candidates by maximizing the (possibly penalized) likelihood, or some other empirical criterion of update of the $\hat{P}^{current}$ based on the tentative candidate nuisance parameter estimator and the target feature. The empirical criterion may be determined by the selection criterion module 20, which evaluates (e.g., based on a log likelihood penalized to a varying degree, d) a mapping from $(\hat{P}, \hat{g})$ to an estimator that is a real number. The bias of $\hat{g}_k^*$ goes to 0 for a large enough k, or alternatively, some other measure of adaptivity of $\hat{g}_k^*$ increases with k, such as an estimator of the variance of the targeted maximum likelihood estimator corresponding to $\hat{g}_k^*$, or such as an estimate of the variance of the efficient influence curve at $\hat{g}_k^*$ and the corresponding P-estimator.

The candidate $\hat{g}'_{k+1}$ acceptor compares the tentative $(k+1)^{th}$ candidate with the candidate previously accepted at the current value of k, to see if the $(k+1)^{th}$ step offers an improvement over the $k^{th}$ step with regard to some criterion, such as the (possibly penalized) likelihood of the update of $\hat{P}^{current}$. When the $(k+1)^{th}$ step does offer an improvement, the candidate nuisance parameter is accepted, k is updated to k+1, and the most recently accepted candidate, denoted as $\hat{g}_k^*$, is used in the next iteration of the single-step candidate estimator module.

When the $(k+1)^{th}$ step does not offer an improvement to the criterion, the single-step $\hat{P}^{current}$-updater module 46 modifies $\hat{P}^{current}$ based on the targeted feature and the nuisance parameter estimator $\hat{g}_k^*$ to yield a P-estimator used as an initial estimator in the next iteration of the single-step candidate estimator module and the single-step candidate selector module.

Figure 3:
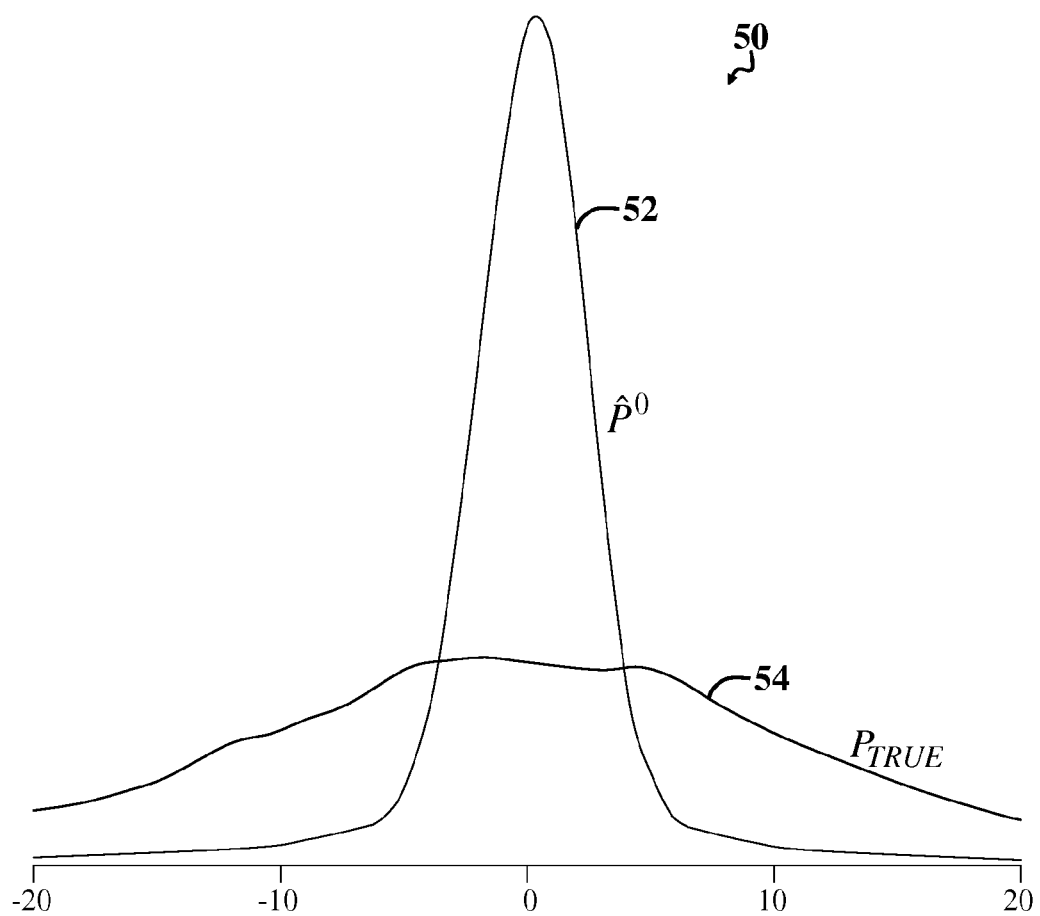
FIG. 3 is a graph illustrating an example of an initial estimator that is a relatively poor estimate of a true probability distribution.

FIG. 3 is a graph illustrating an example of an initial estimator ($\hat{P}^0$) 52 that is a relatively poor estimate of a true probability distribution ($P_{TRUE}$) 54.

Figure 4:
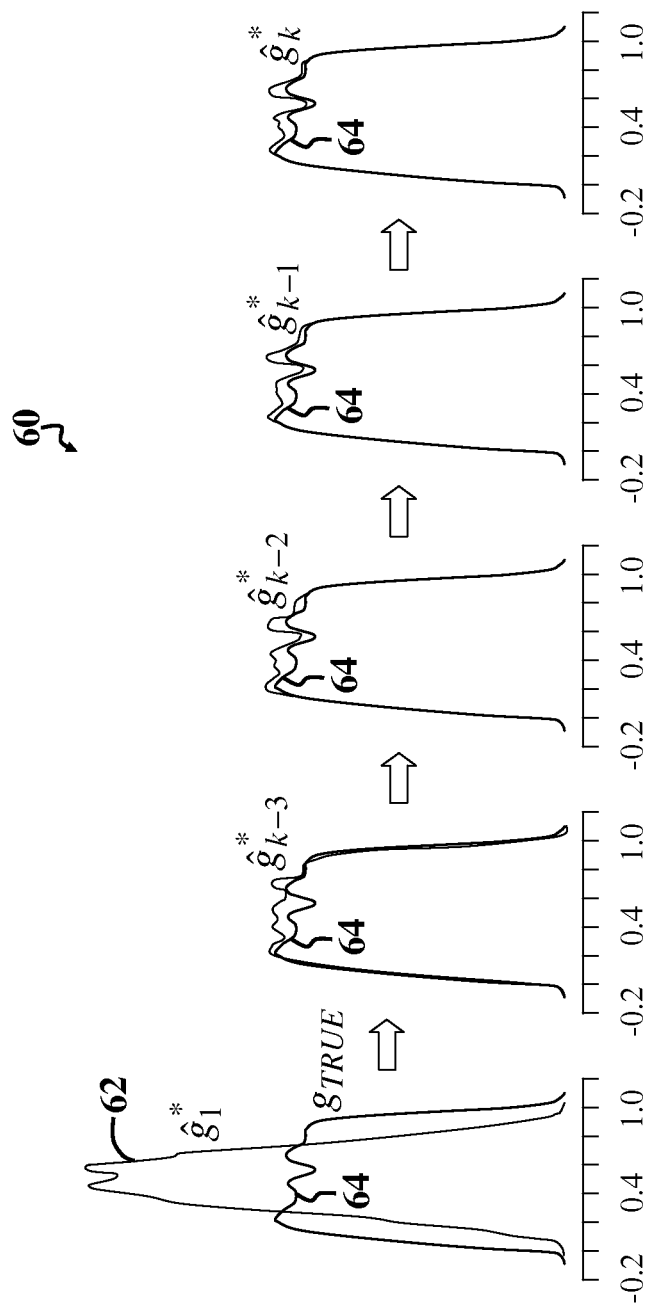
FIG. 4 shows a sequence of graphs illustrating iterative adaptation of an estimator (g-estimator) of a nuisance parameter via the embodiment of FIGS. 1-2 in collaboration with an initial distribution estimator that is a relatively poor fit to the true distribution of a given dataset.

FIG. 4 shows a sequence of graphs 60 illustrating iterative adaptation of an estimator ($\hat{g}_1^*$) 62 of a nuisance parameter via the embodiment of FIGS. 1-2 that is implemented in collaboration with an initial distribution estimator (such as the distribution estimator $\hat{P}^0$ 52 of FIG. 3) that is a relatively poor fit to the true distribution $P_{TRUE}$ of a given dataset. Nevertheless, the series of g-estimators ($\hat{g}^*$) converges relatively quickly to $g_{TRUE}$ 64 (i.e., the true distribution characterizing the nuisance parameter) even when the iteration of the g-estimators begins with a relatively poor initial distribution estimator $\hat{P}^0$.

In summary, FIG. 4 shows five different g-estimators $\hat{g}^*$ that are determined. As shown, a $\hat{g}_1^*$ is initially substantially biased compared to the $g_{TRUE}$. However, $\hat{g}^*$ quickly becomes largely unbiased as compared to $g_{TRUE}$. Thus, the series $\hat{g}^*$ quickly approximates an unbiased estimator of $g_{TRUE}$.

Figure 5:
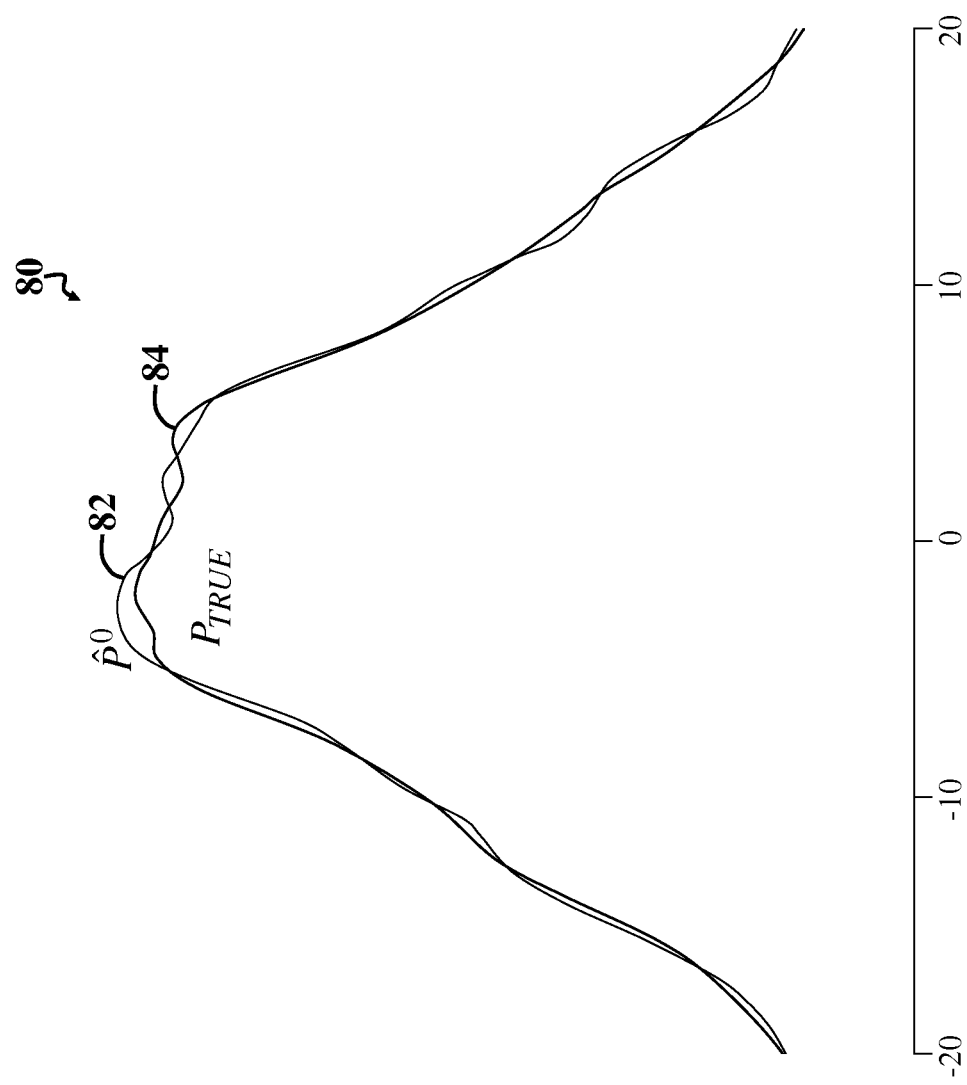
FIG. 5 is graph illustrating an example of an estimator constructed in accordance with the embodiment of FIGS. 1-2 that provides a relatively accurate estimate of a true probability distribution.

FIG. 5 is graph 80 illustrating an example of an estimator ($\hat{P}^0$) 82 constructed in accordance with the embodiment of FIGS. 1-2 that provides a relatively accurate estimate of a true probability distribution ($P_{TRUE}$) 84.

Figure 6:
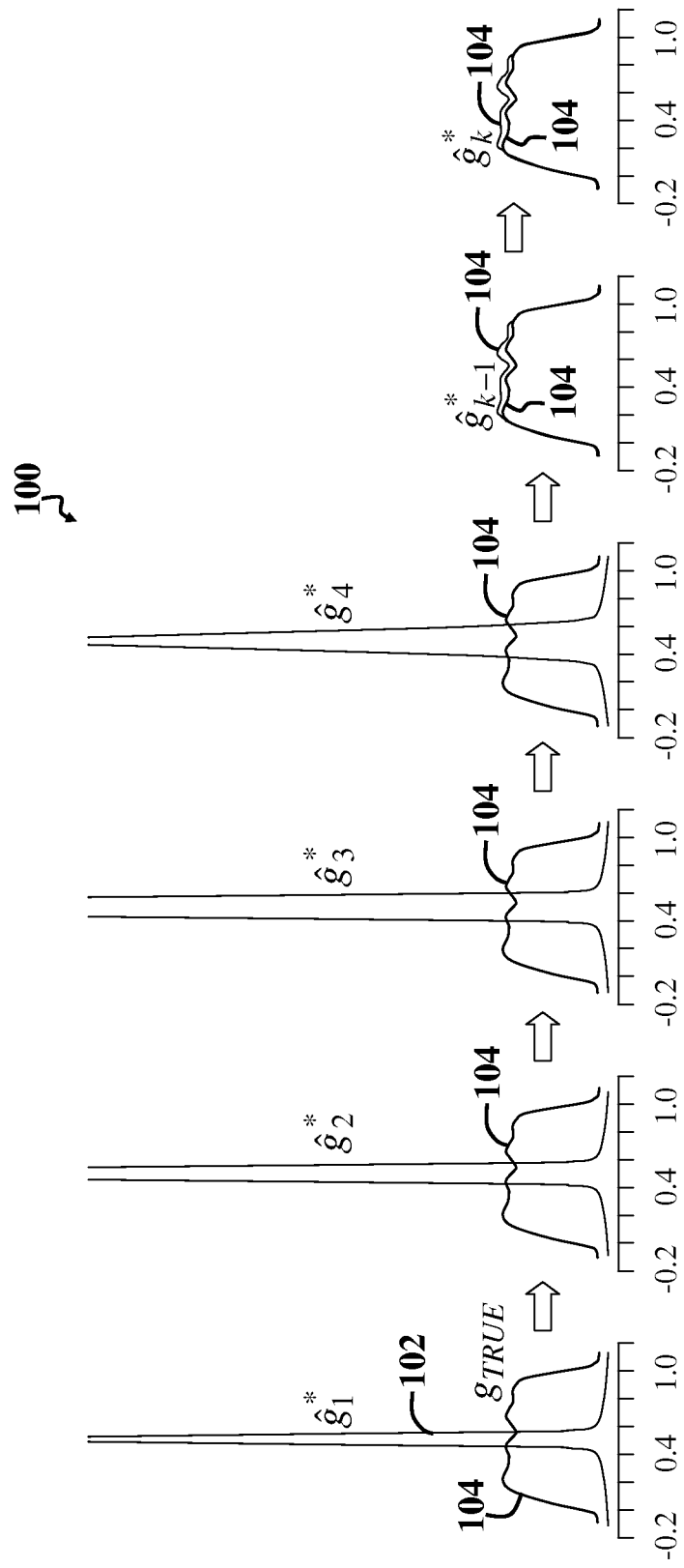
FIG. 6 shows a sequence of graphs illustrating iterative adaptation of an estimator (g-estimator) of a nuisance parameter via the embodiment of FIGS. 1-2 given a relatively accurate initial distribution estimator.

FIG. 6 shows a sequence of graphs 100 illustrating iterative adaptation of an estimator (g-estimator) $\hat{g}^*$ 102 of a nuisance parameter $g_{TRUE}$ 104 via the embodiment of FIGS. 1-2 given a relatively accurate initial distribution estimator (such as $\hat{P}^0$ 84 of FIG. 5).

FIG. 6 shows a series of $\hat{g}^*$ determinations for $\hat{P}$. In the first four graphs (showing $\hat{g}_1^*$-$\hat{g}_4^*$), $\hat{g}^*$ is largely biased as compared to $g_{TRUE}$. However, in the last two graphs (showing $\hat{g}_{k-1}^*$-$\hat{g}_k^*$), $\hat{g}^*$ is largely unbiased as compared to $g_{TRUE}$ 64. Thus the series of estimators $\hat{g}^*$ slowly approximates an unbiased estimator of $g_{TRUE}$. Accordingly, the rate at which the series becomes unbiased depends upon the performance of initial estimator $\hat{P}$ in estimating $P_{TRUE}$.

Note that although the initial g-estimator $\hat{g}_1^*$ is initially a poor fit to $g_{TRUE}$ the g-estimator $\hat{g}_k^*$ still converges to $g_{TRUE}$. This ability to converge nuisance parameter estimates $\hat{g}^*$ to $g_{TRUE}$ for use in determining one or more accurate targeted distribution estimators $\hat{P}^*$, as afforded by the embodiments of FIGS. 1-2, enables significant benefits for determining answers to desired features of interest pertaining to data.

Figure 7:
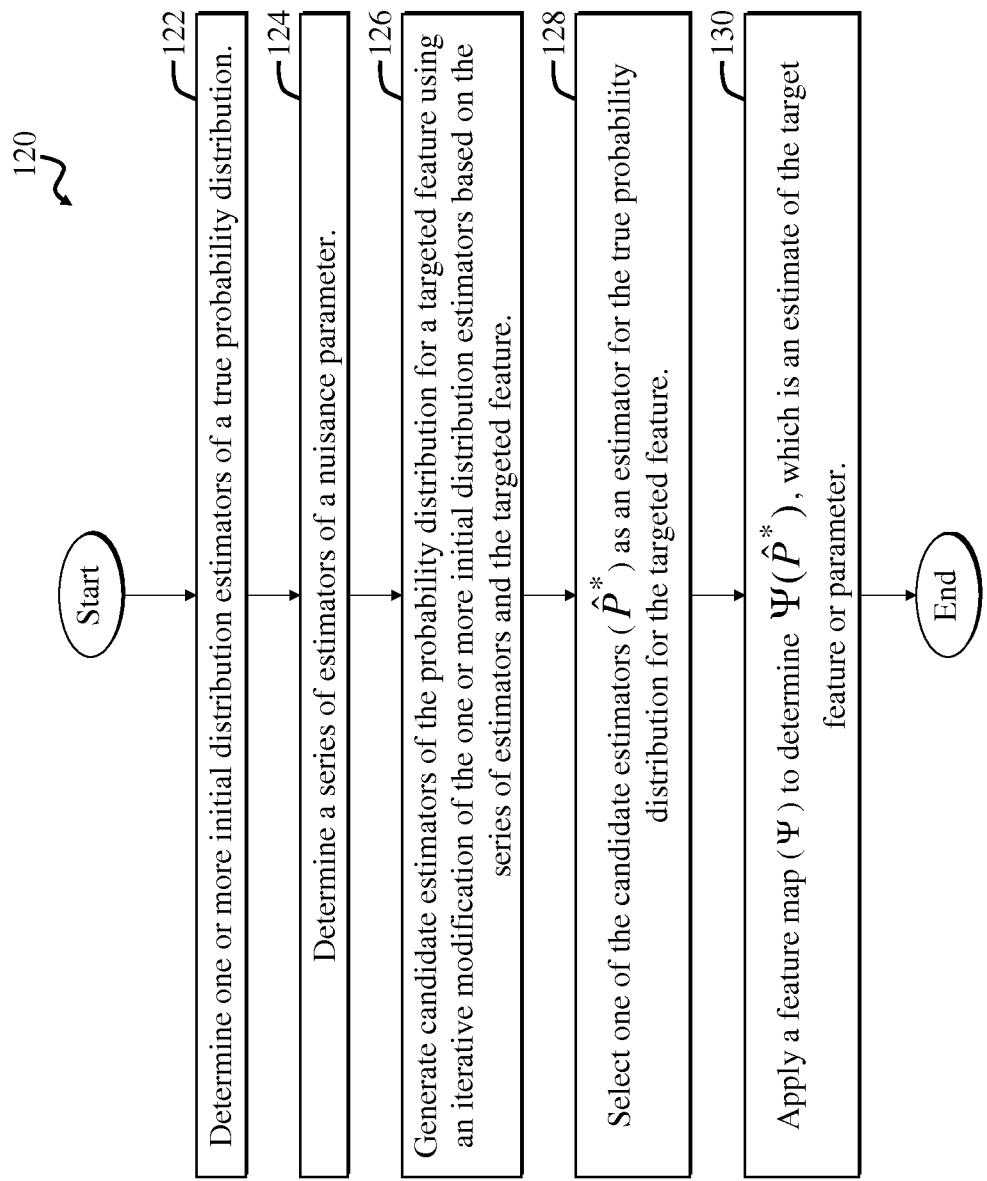
FIG. 7 is a flow diagram of a first example method adapted for use with the embodiments of FIGS. 1-2.

FIG. 7 is a flow diagram of a first example method 120 adapted for use with the embodiments of FIGS. 1-2. The method includes a first step 122 that involves determining one or more initial distribution estimators of a true probability distribution.

A second step 124 includes determining a series of estimators of a nuisance parameter.

A third step 126 includes generating candidate estimators of the probability distribution for a targeted feature using an iterative modification of the one or more initial distribution estimators based on the series of estimators and the targeted feature.

A fourth step 128 includes selecting one of the candidate estimators as an estimator for the true probability distribution for the targeted feature.

A final step 130 evaluates the target feature by applying the target feature mapping to the selected candidate estimator of the true probability distribution.

Note that the various steps 122-128 may be modified, iterated, augmented without departing from the scope of the present teachings.

An example alternative related method includes: 1) starting with a first stage initial estimator of the relevant factor (feature of interest) of the likelihood of a distribution of data; 2) generating an estimator of a censoring mechanism (e.g., nuisance parameter) based on an algorithm that maximizes, over candidate estimators of the censoring mechanism, the log-likelihood of the corresponding candidate targeted maximum likelihood estimators of the relevant factor; 3) selecting the resulting targeted maximum likelihood estimator at this particular selected estimator of the censoring mechanism, resulting in an update of the initial estimator; and 4) iterating using steps 1-3 using an update from step 3 as an initial estimator in step 1 to generate a sequence of targeted maximum likelihood estimators at increasingly nonparametric censoring mechanism estimators by maximizing the targeted log-likelihood as in step 2—either over augmentations of the previously obtained fit of the censoring mechanism or over all candidate estimators that are more nonparametric than the previous one.

For the purposes of the present discussion, a nonparametric estimator of a mechanism may be any estimator of that mechanism that does not rely upon an a priori assumption of a given probability distribution or a mechanism that does not otherwise depend on population fitting of any parametrized distributions. Nonparametric models differ from parametric models in that the model structure is not specified a priori but is instead determined from data. The term nonparametric does not necessarily imply that such models/mechanisms completely lack parameters but that the number and nature of the parameters are not necessarily fixed in advance. Hence, estimators in a sequence are increasingly nonparametric if they increasingly less dependent on prior unknown assumptions, and thereby are less biased for the true probability distribution or mechanism, as the sequence advances.

FIG. 8 is a flow diagram of a second example method 140 adapted for use with the embodiments of FIGS. 1-2. The second method 140 is particularly adapted to provide estimators of a nuisance parameter, also called censoring mechanism.

The second method 140 includes an initial selecting step 142, which involves selecting an initial estimator ($\hat{g}_1^*$) of a nuisance parameter, wherein the nuisance parameter is characterized by a true distribution ($g_{TRUE}$).

A subsequent employing step 144 includes employing the initial estimator ($\hat{g}_1^*$), and an initial estimator ($\hat{P}^0$) of a distribution of a dataset to construct a set of tentative candidate estimators of the nuisance parameter based on a sequence of estimators of a nuisance parameter.

Next, a selecting step 146 includes selecting an estimator from the set of tentative candidate estimators based on a first predetermined selection method, thereby providing one or more selected estimators of the nuisance parameter.

Finally, an iteration step 148 includes iteratively update the set of tentative candidate nuisance parameter estimators based on previously selected nuisance parameter estimators and initial estimator $\hat{P}^0$ to facilitate obtaining one or more updated preferred candidate estimators $\hat{P}^*$.

Note that the example method 140 may be altered without departing from the scope of the present teachings. For example, first predetermined method may include maximizing a likelihood of a $k^{th}$ update of a distribution estimator ($\hat{P}$) of a dataset.

An example alternative to the method 140 includes: selecting the initial estimator $\hat{g}_1^*$ of a nuisance parameter, wherein the nuisance parameter is characterized by a true distribution $g_{TRUE}$; employing the initial estimator $\hat{g}_1^*$ to construct a set of tentative candidate estimators of the nuisance parameter based on a sequence of estimators of a nuisance parameter; selecting an estimator from the set of tentative candidate estimators based on a first predetermined selection method and providing one or more selected estimators of the nuisance parameter in response thereto; and choosing a preferred candidate estimator of the nuisance parameter from the selected estimators of the nuisance parameter based on a second predetermined selection method.

A general discussion of collaborative maximum likelihood learning, i.e., estimation concepts pertaining to embodiment disclosed herein follows. Collaborative Double Robust Targeted Maximum Likelihood Estimation (C-DR-TMLE) provides a fundamental further advance of the targeted maximum likelihood estimation methodology, by providing a more robust and optimal estimator of the target parameter in a non-parametric or semi-parametric model.

Targeted maximum likelihood estimation involves estimation of a nuisance parameter in order to carry out the targeted maximum likelihood step. C-DR-TMLE recognizes the collaborative double robustness property of targeted maximum likelihood estimation which states that it is possible to obtain a completely unbiased targeted maximum likelihood estimate of the parameter of interest by estimating only a portion of the nuisance parameter, where this portion depends on the remaining bias of the initial estimator. The appropriate nuisance parameter fit is determined data-adaptively, and varies in response to the fit of the initial first-stage probability distribution estimate.

As a concrete example, consider estimation of the population-level effect of a point treatment, e.g., a new drug versus the standard drug, the drug choice denoted with A, on an outcome Y, based on a set of observations, $O\_1, \ldots O\_n$, on n subjects drawn at random from a population. Let $O=(W,A,Y)$ denote the random variable representing the data on a randomly sampled subject, where W is a set of measurements of baseline covariates (e.g., age, sex, etc.), $A=1$ represents treatment, $A=0$ represents control (no treatment), and Y is a measured outcome (e.g. blood pressure, indicator of cure/no cure or mortality). Because the effect may vary among subjects having different profiles as defined by their individual values for covariates, W, (for example, perhaps the drug is less effective among women than men), the summary measure of the population probability distribution of O of interest is defined as the overall average effect of treatment accounting for differences in the population distribution of W between the treatment and control group, $E_W(E(Y|A=1,W)-E(Y|A=0,W))$, where $E(Y|A,W)$ denotes the population mean of the outcome Y as a function of treatment choice and covariates. This defines now a parameter of the true probability distribution of 0 we wish to estimate from the data set $O\_1, \ldots O\_n$ collected on the n subjects. Note that the parameter mapping does not need to know the whole probability distribution of O, but only the conditional mean of Y, $E(Y|A,W)$, and the marginal probability distribution of W. It is known that the above target parameter equals a causal effect of treatment on outcome if the covariates include all confounders.

One embodiment of the C-TMLE approach to this problem is to first obtain an initial P-estimator $\hat{P}^0$ corresponding to the conditional mean of Y given A and W, denoted as $Q_n^0$ in the literature. Applying the parameter mapping $\Psi$ directly to this estimate $Q_n^0$ of the conditional mean of the outcome and the empirical distribution of covariates W may yield a biased treatment effect estimate. Bias can be reduced or entirely removed by instead applying $\Psi$ to a selected updated P-estimator $\hat{P}^k$, also denoted as $Q_n^k$. $\hat{P}^k$ is the $k^{th}$ in a series of candidate estimators, representing a sequence of updates based on the initial $\hat{P}^0$, and a series of corresponding nuisance parameter estimates $\hat{g}'_1, \ldots, \hat{g}'_k$, constructed using forward selection. The nuisance parameter is the conditional probability distribution of treatment A as a function of the covariates W, denoted with $g_{TRUE}$, so that these nuisance parameter estimates are estimates of this true probability distribution of treatment.

A fluctuation of an initial P-estimator as in the TMLE using $g_{TRUE}$ can be shown to remove all the bias for the target parameter. However, this true nuisance parameter is typically not known, so that it needs to be estimated. The forward selection algorithm concerns one approach for constructing a series of targeted maximum likelihood estimators indexed by a corresponding series of nuisance parameter estimators. For example, all nuisance parameter models of size 1 are constructed, and each is used to fluctuate the initial P-estimator, and tentatively create a candidate $\hat{P}_w^1$, where w indexes the baseline covariate included in the nuisance parameter model. P-estimator $\hat{P}^1$ corresponds to the candidate $\hat{P}_w^1$ maximizing the penalized likelihood or another empirical criterion evaluating its fit. This forward selection approach which augments a current estimate of nuisance parameter into an updated estimate that includes an additional covariate continues.

The next step is to consider all nuisance parameter models of size 2, where the first term is the covariate chosen in the previous step, ($w_1$), and the second term is one of the remaining covariates in the set. If no model of size two yields a P-estimator that improves upon the best model of size 1, the running estimator $\hat{P}^0$ is updated to $\hat{P}^1$ so that the latter is now the estimator to be updated in subsequent steps, and now addition of a second fluctuation of the latter update based on the best model for g of size 2 will increase the empirical criterion employed. Each candidate $\hat{P}^k$ is constructed in this manner, and it is indexed by a corresponding nuisance parameter estimate that was used to fluctuate a running estimator into this $\hat{P}^k$. Cross validation based on a loss function, or the empirical criterion employed in the forward selection algorithm, targeted towards the parameter of interest, the additive point treatment effect, selects $\hat{P}^*$, the best among all k updated candidate $\hat{P}$-estimators. In the point treatment example, $\hat{P}^*$ corresponds to an updated estimate of the conditional mean of Y given A and W. One now evaluates the target parameter for this selected P-estimator. Specifically, for each observation i in the dataset with covariate profile $W_i$, an estimate of the mean outcome is obtained with A set to 0 and the covariates set to the values $W_i$ in that observation, representing an estimate of the expected outcome when a subject with this particular profile, $W_i$, does not receive treatment. A corresponding estimate is obtained for each observation with A set to 1, representing the expected outcome when a subject with profile $W_i$ does receive treatment. For each observation, the difference between these two estimated mean outcomes at treatment and no-treatment, can be interpreted as a treatment effect for a person with that covariate profile. The target parameter, the average predicted difference in the outcome attributable to treatment, is evaluated as the treatment effect averaged over all observations.

Specifically, taking the initial estimator as starting point, by iterative application of the targeted maximum likelihood step, we create a sequence of increasingly non-parametric (data-adaptive) candidate targeted maximum likelihood estimators in which the targeted maximum likelihood step is indexed by increasingly nonparametric (data-adaptive) estimates of the nuisance parameter. Likelihood-based or general loss-based cross validation, with known optimal oracle properties, is utilized to select among these candidate estimators. Estimates obtained in this way may share all the desirable properties of targeted maximum likelihood estimates (e.g., efficient, unbiased, influence curve-based inference) while providing a gain theoretically and in practical performance.

In addition, particular embodiments present a penalization of the log likelihood that makes the log likelihood sensitive to the parameter of interest. The penalization is then applied in this C-DR-TMLE methodology in a penalized log-likelihood. In this manner, the resulting C-DR-T(Penalized)MLE maintains a robust performance even if the target parameter is borderline identifiable.

In more detail, C-DR-TMLE provides a new, double robust, asymptotically efficient method for mapping data into an estimate of the target parameter of interest of the data generating probability distribution.

C-DR-TMLE builds on the earlier statistical method of targeted maximum likelihood estimation, which involves maximizing the log-likelihood or another empirical criterion of n observations on n random variables over a parametric fluctuation of an initial P-estimator. This fluctuation is targeted to yield an updated estimate of the P-estimator that reduces bias in subsequent estimation of the parameter of interest. The precise nature of the fluctuation depends on the value of a nuisance parameter, for example a censoring or treatment mechanism, which is often unknown and must therefore be estimated from the data.

An outstanding open problem that obstructs the truly robust practical application of double robust estimators, including the targeted maximum likelihood estimators (in particular, in nonparametric censored data or causal inference models) is the selection of a sensible model or estimator of the nuisance parameter needed to evaluate the fluctuation model: this is especially the case when the efficient influence curve estimating equation involves inverse probability of censoring or treatment weighting, due to the enormous sensitivity of the estimator of the parameter of interest to the estimator of the censoring or treatment mechanism. (Intuitively, the efficient influence curve can be viewed as a transformation of the random variable one observes on the experimental unit that captures all the relevant information of the random variable (drawn from the specific probability distribution) for the purpose of estimating the scientific parameter.)

C-DR-TMLE provides for nuisance parameter estimator selection for targeted maximum likelihood estimators that addresses this challenge by using the log-likelihood or another empirical criterion of the targeted maximum likelihood estimator indexed by the nuisance parameter estimator as the principal selection criterion. In one embodiment, C-DR-TMLE is a two-stage methodology in which an initial estimate of the density is established in stage 1, and candidate estimators are constructed by coupling the stage 1 estimator with increasingly non-parametric fits of the nuisance parameter, for example a censoring mechanism, in stage 2. The stage 1 estimate can be arrived at by any data-adaptive algorithm providing consistent estimates, but may stem from a density estimator based on maximizing the log likelihood while controlling for over fitting by the use of cross-validation or penalization. In one particular embodiment an ordering can be imposed upon individual covariates or pre-computed nuisance parameter estimates according to an empirical criterion that is a function of the stage 1 estimate and the target parameter, for example an estimate of the variance of the efficient influence curve of the target parameter, or the log likelihood. This ordering can be exploited when constructing the series of nuisance parameter estimates to make the procedure more robust and reduce computation time.

The stage 2 candidates, indexed by 1, . . . , K, are defined as the $k^{th}$ iterative application of a targeted maximum likelihood step. At each targeted maximum likelihood step, the choice of censoring mechanism may be based on maximizing the targeted log-likelihood gain and a set of candidates to choose from, where the set of candidates to choose from needs to be more nonparametric than the censoring mechanism estimator selected in the previous step. For example, particular embodiments might a priori generate a set of candidate maximum likelihood estimators of a censoring mechanism nuisance parameter based on a sequence of models that approximates the truth (i.e., a so called sieve). The collaborative TMLE is now defined by selecting k based on the cross-validated targeted log-likelihood or another empirical criterion of the data. This choice $k_n$ of the cross-validation selector also identifies a choice of nuisance parameter estimator, signaling how aggressively collaborative TMLE discussed herein pursues the bias reduction. This particular way of selecting the censoring mechanism estimator has implications for the practical and theoretical behavior of the collaborative TMLE relative to a single step TMLE based on an external estimator of the nuisance parameter.

From an asymptotic perspective the use of the log-likelihood or other appropriate empirical loss function of the targeted maximum likelihood estimator as the selection criterion results in collaborative double robustness of the resulting collaborative targeted maximum likelihood estimators. However in various applications in which the target parameter is borderline identifiable, for the purpose of nuisance parameter estimator selection the log-likelihood or other appropriate empirical loss function may not be sensitive enough towards the mean squared error of the parameter of interest. Therefore particular embodiments define a targeted penalized log-likelihood based criterion that can instead be used to select among targeted maximum likelihood estimators, again indexed by different choices for the nuisance parameter estimator. In one embodiment our penalty concerns an estimate of mean squared error defined by an estimate of the covariance matrix of the efficient influence curve of the parameter of interest at the candidate estimator, and a bias estimate of the candidate (targeted maximum likelihood) estimator relative to its limit.

Theoretical results confirm that the cross-validation selector of the nuisance parameter will choose the candidate that best targets a direction towards the true distribution of the data that was not fitted by the initial estimator defined in Stage 1. In addition, candidate k can be viewed as an updated fit to an initial estimate of the density given by candidate k−1. This updated fit may be preferred by the cross-validation selector if the convergence of the nuisance parameter estimate to the correct model is relatively faster than the convergence of the overall estimate of the density to the truth. This behavior is a marked improvement over standard targeted maximum likelihood estimation and all other methods in the literature, whose reliance on external nuisance parameter estimation can result in an estimator with a worse performance than the initial even when the initial estimator is performing well. Particular embodiments also provide tools for statistical inference based on the influence curve of the C-TMLE.

Constructing and evaluating candidate targeted maximum likelihood estimators indexed by degree of non-parametric estimation of the fluctuation need not be carried out iteratively. Other implementations, for example a massively parallel implementation of the underlying principals, are easily envisioned. The description of the algorithm would look quite different, but the essential underlying properties of the C-DR-TMLE estimator would remain intact.

The new collaborative double robustness is superior to the classical double robustness by providing additional important robustness: For example, in censored data models the censoring mechanism (or, more general, the nuisance parameter that identifies the optimal fluctuation function used in the TMLE) may condition only on confounders/covariates that have not been fully explained by the estimator of the relevant full-data distribution factor of the likelihood. If the initial estimator approximates the truth well, then this implies that the C-DR-TMLE is more efficient than the locally efficient DR-TMLE: that is, the C-DR-TMLE can be a so called super-efficient estimator that achieves an asymptotic variance that can be smaller than the variance of the efficient influence curve. In fact, the finite sample simulations show a remarkable superiority of the C-DR-TMLE relative to an efficient estimator like the DR-TMLE for estimation of a causal effect in the presence of confounding across many simulation settings. This remarkable superiority is also predicted by the theory for the cross-validations selector that selects among the constructed candidate C-TMLE's obtained by iteratively fluctuating the current estimator with more and more nonparametric nuisance parameter estimators.

Although a process or module or device of embodiments disclosed herein may be presented as a single entity, such as software executing on a single machine, such software and/or modules can readily be executed on multiple machines in hardware and/or software. Furthermore, multiple different modules and/or programs of embodiments of the present invention may be implemented on one or more machines without departing from the scope thereof.

Any suitable programming language can be used to implement the routines or other instructions employed by various modules or entities. Exemplary programming languages include C, C++, Matlab, Mathematica, R, Splus, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed simultaneously in parallel, such as via pipelined processing or via parallel processors or engines.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A module or processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an example embodiment", or "a specific embodiment" means that a particular feature, structure, or characteristic described in connection with the embodiment is included in an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
   determining one or more initial distribution estimators of a true probability distribution;
   determining a series of estimators of a nuisance parameter;
   generating targeted candidate estimators of the probability distribution for a targeted feature using an iterative modification of the one or more initial distribution estimators based on the series of estimators and the targeted feature; and
   selecting one of the candidate estimators as an estimator for the true probability distribution for the targeted feature.

2. The method of claim 1, further including applying a mapping to the selected estimator to determine an estimated value for the targeted feature.

3. The method of claim 1, wherein generating the candidate estimators comprises determining a first candidate estimator for a first estimator of the nuisance parameter.

4. The method of claim 3, further comprising:
   using the first candidate estimator and a second estimator of the nuisance parameter to determine a second candidate estimator.

5. The method of claim 1, wherein selecting one of the candidate estimators includes applying a likelihood based analysis to an update of an initial distribution estimator, wherein the update depends on the nuisance parameter estimator.

6. The method of claim 5, wherein the update of the initial distribution estimator includes a targeted maximum likelihood estimator.

7. The method of claim 5, wherein the likelihood based analysis includes using a likelihood criterion applied to an update of an initial distribution estimator using a candidate nuisance parameter estimator to determine the selection.

8. The method of claim 7, further comprising:
   determining a penalized likelihood criterion, wherein a penalty to be applied to the likelihood criterion is determined based on a function of the candidate estimators of the probability distribution for the targeted feature.

9. The method of claim 8, wherein the function includes an estimate of the mean square error of the targeted feature of the candidate estimators of the probability distribution.

10. The method of claim 1, wherein a plurality of estimators for the true probability distribution are determined, the method further comprising:
    selecting one of the plurality of estimators based on a criterion.

11. The method of claim 10, wherein the selecting is performed based on a likelihood based analysis.

12. A method for obtaining an estimator of a true probability distribution, and a corresponding estimator of a target feature, the method comprising:
    selecting one or more initial estimators ($\hat{P}$) of a true probability distribution ($P_{TRUE}$) of a dataset based on one or more candidate estimators (P), a feature map ($\Psi$), and the dataset;
    determining one or more series of estimators (g-estimators) of a nuisance parameter ($g_{TRUE}$); and
    employing the one or more series of estimators (g-estimators) to modify the one or more initial estimators ($\hat{P}$) and to provide one or more candidate targeted estimators ($\hat{P}^*$) in response thereto.

13. The method of claim 12, further including applying the feature map to the selected targeted estimator ($\hat{P}^*$) to obtain an estimated value for the target feature.

14. The method of claim 12, wherein employing further includes using a targeted feature and the one or more series of estimators (g-estimators) to provide the one or more candidate targeted estimators ($\hat{P}^*$).

15. The method of claim 14, wherein employing further includes iteratively modifying one or more initial estimators ($\hat{P}$) by updating the one or more series of estimators (g-estimators) with one or more updated versions of the initial estimators ($\hat{P}$) to yield further updated one or more estimators and providing a series of iteratively modified estimators ($\hat{P}^*$) in response thereto.

16. The method of claim 15, wherein a series of the one or more series of estimators (g-estimators) includes a first estimator that is less data-adaptive than a second estimator.

17. The method of claim 15, wherein each successive iteratively modified estimator ($\hat{P}^*$) in the series of iteratively modified estimators more closely fits the data generated by the true probability distribution ($P_{TRUE}$) than each previous iteratively modified estimator of the series.

18. The method of claim 15, further including selecting a preferred modified estimator from the series of iteratively modified estimators ($\hat{P}^*$) based on a predetermined selection method.

19. The method of claim 18, wherein the predetermined selection method includes likelihood-based cross-validation of candidate modified estimators that are based on one or more series of nuisance parameter estimators ($\{\hat{g}\}_i$).

20. The method of claim 12, wherein an initial P-estimator module is adapted to receive the dataset, the one or more candidate estimators (P), and the feature map ($\Psi$) as input thereto and to provide one or more initial distribution estimators as output in response thereto.

21. The method of claim 20, wherein a collaborative g-estimator module is adapted to provide a first series of estimators of the nuisance parameter ($g_{TRUE}$) based on the one or more initial distribution estimators and to further provide one or more subsequent series of estimators of the nuisance parameter ($g_{TRUE}$) based on one or more updated initial distribution estimators.

22. The method of claim 20, wherein a targeted P-estimator ($\hat{P}^*$) is adapted to employ a series of estimators of a nuisance parameter output by a collaborative g-estimator module to provide the one or more updated initial distribution estimators.

23. The method of claim 12, further including a targeted P-selector module in communication with a targeted P-estimator module, wherein the targeted P-estimator module is adapted to select one or more iteratively modified estimators output from the targeted P-estimator module.

24. A method comprising:
obtaining a dataset;
determining a first set of one or more candidate estimators (P) of a true probability distribution ($P_{TRUE}$) of the dataset;
employing a feature map, the dataset, and the one or more candidate estimators to determine a set of one or more initial distribution estimators ($\hat{P}$);
using the feature map and the set of one or more initial distribution estimators ($\hat{P}$) to determine a series of estimators (g-estimators) of a nuisance parameter ($g_{TRUE}$); and
modifying the set of one or more initial distribution estimators ($\hat{P}$) via the series of estimators (g-estimators) of a nuisance parameter, yielding one or more modified estimators ($\hat{P}^*$) in response thereto.

25. A method comprising:
selecting an initial estimator ($\hat{g}_1^*$) of a nuisance parameter, wherein the nuisance parameter is characterized by a true distribution ($g_{TRUE}$);
employing the initial estimator ($\hat{g}_1^*$) to construct a set of tentative candidate estimators of the nuisance parameter based on a sequence of estimators of a nuisance parameter;
selecting an estimator from the set of tentative candidate estimators based on a first predetermined selection method and providing one or more selected estimators of the nuisance parameter in response thereto; and
choosing a preferred candidate estimator of the nuisance parameter from the selected estimators of the nuisance parameter based on a second predetermined selection method.

26. A method comprising:
generating a sequence of targeted maximum likelihood estimators, wherein the sequence includes estimators with increasing likelihood, and wherein each estimator that has a higher likelihood than a previous estimator is indexed by a nuisance parameter estimator that is more nonparametric than a previous nuisance parameter estimator used to index the previous estimator;
updating one or more estimators of the sequence of targeted maximum likelihood estimators and providing one or more updated estimators in response thereto, wherein updating includes adjusting one or more nuisance parameters that index targeted maximum likelihood estimators of the sequence; and
selecting one or more estimators from the updated estimators and providing one or more selected estimators.

27. The method of claim 26, wherein selecting includes selecting one or more estimators from the updated estimators and providing one or more selected estimators and the result of applying mapping ($\Psi$) to the one or more selected estimators to obtain an estimate of the target feature.

* * * * *